United States Patent
Borgia et al.

(10) Patent No.: US 8,181,016 B1
(45) Date of Patent: May 15, 2012

(54) APPLICATIONS ACCESS RE-CERTIFICATION SYSTEM

(75) Inventors: Evelyn Borgia, Hauppauge, NY (US); Jodi Breslin, Syosset, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 1368 days.

(21) Appl. No.: 11/464,067

(22) Filed: Aug. 11, 2006

Related U.S. Application Data

(60) Provisional application No. 60/741,044, filed on Dec. 1, 2005.

(51) Int. Cl.
  *H04L 29/06* (2006.01)
(52) U.S. Cl. .................... 713/156; 726/1; 726/2; 726/4; 726/5; 726/6
(58) Field of Classification Search ................... 713/156
  See application file for complete search history.

(56) References Cited

U.S. PATENT DOCUMENTS

| | | |
|---|---|---|
| 4,751,702 A | 6/1988 | Beier et al. |
| 5,027,269 A | 6/1991 | Grant et al. |
| 5,075,881 A | 12/1991 | Blomberg et al. |
| 5,313,616 A | 5/1994 | Cline et al. |
| 5,347,518 A | 9/1994 | Lee |
| 5,446,895 A | 8/1995 | White et al. |
| 5,539,885 A | 7/1996 | Ono et al. |
| 5,563,998 A | 10/1996 | Yaksich et al. |
| 5,566,297 A | 10/1996 | Devarakonda |
| 5,594,863 A | 1/1997 | Stiles |
| 5,630,047 A | 5/1997 | Wang |
| 5,630,069 A | 5/1997 | Flores et al. |
| 5,638,513 A * | 6/1997 | Ananda ............................ 726/5 |
| 5,655,074 A | 8/1997 | Rauscher |
| 5,701,471 A | 12/1997 | Subramanyam |

(Continued)

FOREIGN PATENT DOCUMENTS

WO     WO 01/74043     10/2001

OTHER PUBLICATIONS

Priebe et al., A Pattern System for Access Control, Sep. 1, 2004, Springer Boston, Research Directions in Data and Applications Security XVIII, vol. 144, pp. 235-249.*

(Continued)

*Primary Examiner* — Taghi Arani
*Assistant Examiner* — Kenneth Chang
(74) *Attorney, Agent, or Firm* — Hunton & Williams LLP

(57) ABSTRACT

An applications access re-certification system is disclosed. The system is used for approving and re-certifying a user's access rights to applications stored or existing in an institution's computer system based on reviewing in a configurable timeframe the user's functional roles by designated reviewers. The system is used to ensure security of the applications by means of a reviewing process. The system is used to automate the re-certification process by means of a computer-controlled re-certification system which automatically operates in a defined methodology under control of re-certification administrators. The system could perform a management summary of access rights to the applications, and a automated scorecard to monitor the re-certification progress. The system could carry out a control process to ensure the changes to existing permissions are effectively managed at source destinations. The system has a capability of initiating multiple approvers for re-certifying a user's access rights.

19 Claims, 28 Drawing Sheets

U.S. PATENT DOCUMENTS

| | | |
|---|---|---|
| 5,712,971 A | 1/1998 | Stanfill et al. |
| 5,721,913 A | 2/1998 | Ackroff et al. |
| 5,748,878 A | 5/1998 | Rees et al. |
| 5,752,034 A | 5/1998 | Srivastava |
| 5,758,061 A | 5/1998 | Plum |
| 5,768,506 A | 6/1998 | Randell |
| 5,781,448 A | 7/1998 | Nakamura et al. |
| 5,784,562 A | 7/1998 | Diener |
| 5,799,297 A | 8/1998 | Goodridge et al. |
| 5,806,075 A | 9/1998 | Jain et al. |
| 5,828,883 A | 10/1998 | Hall |
| 5,835,770 A | 11/1998 | Shum et al. |
| 5,845,292 A | 12/1998 | Bohannon et al. |
| 5,872,976 A | 2/1999 | Yee et al. |
| 5,884,037 A | 3/1999 | Aras et al. |
| 5,903,721 A | 5/1999 | Sixtus |
| 5,903,897 A | 5/1999 | Carrier, III et al. |
| 5,920,719 A | 7/1999 | Sutton et al. |
| 5,937,198 A | 8/1999 | Nelson et al. |
| 5,960,196 A | 9/1999 | Carrier, III et al. |
| 5,960,445 A | 9/1999 | Tamori et al. |
| 6,003,075 A | 12/1999 | Arendt et al. |
| 6,009,274 A | 12/1999 | Fletcher et al. |
| 6,026,237 A | 2/2000 | Berry et al. |
| 6,028,938 A | 2/2000 | Malkin et al. |
| 6,029,002 A | 2/2000 | Afifi et al. |
| 6,058,393 A | 5/2000 | Meier et al. |
| 6,067,412 A | 5/2000 | Blake et al. |
| 6,073,107 A | 6/2000 | Minkiewicz et al. |
| 6,088,700 A | 7/2000 | Larsen et al. |
| 6,101,601 A | 8/2000 | Matthews et al. |
| 6,108,673 A | 8/2000 | Brandt et al. |
| 6,119,101 A * | 9/2000 | Peckover ............... 705/26 |
| 6,125,390 A | 9/2000 | Touboul |
| 6,128,708 A | 10/2000 | Fitzpatrick et al. |
| 6,138,112 A | 10/2000 | Slutz |
| 6,145,121 A | 11/2000 | Levy et al. |
| 6,161,139 A * | 12/2000 | Win et al. ............... 709/225 |
| 6,175,833 B1 | 1/2001 | West et al. |
| 6,195,676 B1 | 2/2001 | Spix et al. |
| 6,230,319 B1 | 5/2001 | Britt, Jr. et al. |
| 6,237,035 B1 | 5/2001 | Himmel et al. |
| 6,237,143 B1 | 5/2001 | Fontana et al. |
| 6,243,862 B1 | 6/2001 | Lebow |
| 6,247,029 B1 | 6/2001 | Kelley et al. |
| 6,249,877 B1 | 6/2001 | Kawakami et al. |
| 6,269,479 B1 | 7/2001 | Puram |
| 6,279,039 B1 | 8/2001 | Bhat et al. |
| 6,301,701 B1 | 10/2001 | Walker et al. |
| 6,304,969 B1 * | 10/2001 | Wasserman et al. ........ 713/172 |
| 6,311,327 B1 | 10/2001 | O'Brien et al. |
| 6,363,499 B1 | 3/2002 | Delo et al. |
| 6,363,524 B1 | 3/2002 | Loy |
| 6,405,250 B1 | 6/2002 | Lin et al. |
| 6,405,364 B1 | 6/2002 | Bowman-Amuah |
| 6,411,910 B1 | 6/2002 | Eulau et al. |
| 6,424,981 B1 | 7/2002 | Isaac et al. |
| 6,438,749 B1 | 8/2002 | Chamberlain |
| 6,446,126 B1 | 9/2002 | Huang et al. |
| 6,463,454 B1 | 10/2002 | Lumelsky et al. |
| 6,466,980 B1 | 10/2002 | Lumelsky et al. |
| 6,467,052 B1 | 10/2002 | Kaler et al. |
| 6,470,464 B2 | 10/2002 | Bertram et al. |
| 6,477,471 B1 | 11/2002 | Hedstrom et al. |
| 6,502,207 B1 | 12/2002 | Itoh et al. |
| 6,505,176 B2 | 1/2003 | DeFrancesco, Jr. et al. |
| 6,513,154 B1 | 1/2003 | Porterfield |
| 6,519,763 B1 | 2/2003 | Kaufer et al. |
| 6,526,443 B1 | 2/2003 | Goldsmith et al. |
| 6,546,506 B1 | 4/2003 | Lewis |
| 6,560,580 B1 | 5/2003 | Fraser et al. |
| 6,578,004 B1 | 6/2003 | Cimral et al. |
| 6,578,006 B1 | 6/2003 | Saito et al. |
| 6,584,447 B1 | 6/2003 | Fox et al. |
| 6,587,841 B1 | 7/2003 | DeFrancesco et al. |
| 6,601,017 B1 | 7/2003 | Kennedy et al. |
| 6,601,018 B1 | 7/2003 | Logan |
| 6,601,233 B1 | 7/2003 | Underwood |
| 6,626,953 B2 | 9/2003 | Johndrew et al. |
| 6,629,266 B1 | 9/2003 | Harper et al. |
| 6,850,915 B1 * | 2/2005 | Wiehler ............... 705/57 |
| 7,117,165 B1 * | 10/2006 | Adams et al. ............... 705/26.4 |
| 2001/0013004 A1 * | 8/2001 | Haris et al. ............... 705/1 |
| 2002/0004912 A1 | 1/2002 | Fung |
| 2002/0104006 A1 * | 8/2002 | Boate et al. ............... 713/186 |
| 2002/0104018 A1 * | 8/2002 | Singhani et al. ............... 713/201 |
| 2002/0133593 A1 | 9/2002 | Johnson et al. |
| 2002/0133757 A1 | 9/2002 | Bertram et al. |
| 2002/0138571 A1 | 9/2002 | Trinon et al. |
| 2002/0143929 A1 | 10/2002 | Maltz et al. |
| 2002/0147961 A1 | 10/2002 | Charters et al. |
| 2002/0152395 A1 * | 10/2002 | Zhang et al. ............... 713/200 |
| 2002/0162090 A1 | 10/2002 | Parnell et al. |
| 2002/0165754 A1 | 11/2002 | Tang et al. |
| 2002/0174050 A1 * | 11/2002 | Eynard et al. ............... 705/37 |
| 2002/0184535 A1 * | 12/2002 | Moaven et al. ............... 713/202 |
| 2003/0004848 A1 | 1/2003 | Hellerstein et al. |
| 2003/0018952 A1 | 1/2003 | Roetzheim |
| 2003/0033586 A1 | 2/2003 | Lawler |
| 2003/0037126 A1 * | 2/2003 | Spicer et al. ............... 709/220 |
| 2003/0041000 A1 | 2/2003 | Zajac et al. |
| 2003/0120539 A1 | 6/2003 | Korium et al. |
| 2003/0126050 A1 * | 7/2003 | Theiss et al. ............... 705/35 |
| 2003/0144868 A1 | 7/2003 | MacIntyre et al. |
| 2003/0188290 A1 | 10/2003 | Corral |
| 2003/0196190 A1 | 10/2003 | Ruffolo et al. |
| 2003/0212518 A1 | 11/2003 | D'Alessandro et al. |
| 2003/0225662 A1 | 12/2003 | Horan et al. |
| 2003/0225663 A1 | 12/2003 | Horan et al. |
| 2004/0044866 A1 * | 3/2004 | Casazza ............... 711/163 |
| 2004/0093255 A1 * | 5/2004 | Kelman et al. ............... 705/8 |
| 2004/0193913 A1 * | 9/2004 | Han et al. ............... 713/200 |
| 2004/0254805 A1 * | 12/2004 | Schwerin-Wenzel et al. .... 705/1 |
| 2005/0071807 A1 | 3/2005 | Yanai |
| 2006/0015930 A1 * | 1/2006 | Shoham ............... 726/6 |
| 2006/0053075 A1 * | 3/2006 | Roth et al. ............... 705/50 |
| 2007/0016958 A1 * | 1/2007 | Bodepudi et al. ............... 726/27 |

OTHER PUBLICATIONS

Yi et al., Modeling and Analyzing of Workflow Authorization Management, Dec. 1, 2004, Springer New York, Journal of Network and Systems Management, vol. 12, pp. 507-535.*

Duggan, 2.40 General—Reviews and Abstracts, SPI Database of Software Technologies, p. 1-5, Feb. 1, 1974.

Agostini et al., A Light Workflow Management System Using Simple Process Models, Cooperation Technologies Laboratory, Disco-University of Milano-Bicoca, Aug. 2000.

Georgakopoulos et al., An Overview of Workflow Management: from Process Modeling to Workflow Automation Infrastructure, Kluwer Academic Publishers, Boston, Distributed Parallel Databases, vol. 3, p. 119-153, 1995.

Sammet, Beginning of 4.6 Software Evaluation, Tests and Measurements and RMF I/O Time Validation, Association of Computing Machinery, p. 519, Nov . 1981.

Betwixt: Turning Beans into XML, Apache Software Foundation, archived Jun. 20, 2002 at <http://web.archive. org/web/20020620000410/http://jakarta.apahce.org.commons/betwixt/>, p. 1 of 1, Nov. 13, 2005.

Muehlen, Business Process Automation and Workflow in the Financial Industry, CSK Software AG, Version 3, p. 1-37, Sep. 10, 2003.

Castor: Using Castor XML, ExoLab Group, archived Aug. 27, 2001 at <http://web.archive.org/web/20011019155934/http://www. castor.org/xml-framework.html>, retrieved from the internet on Nov. 11, 2005.

Code Generation for Database Applications, IBM Corporation, p. 1-3, Mar. 1, 2002.

Mohapatra et al, Defect Prevention through Defect Prediction: A Case Study at Infosys, Nov. 2001.

Hilbert, Hilbert, et al., An Approach to Large Scale Collection of Application Usage Data Over the Internet, Software Engineering 1998, Proceedings of the 1998 International Conference, Abstract, Apr. 1998.

Hudeponhl et al., Integrating Metrics and Models for Software Risk Assessment, The Seventh International Symposium on Software Reliability Engineering (ISSRE '96), p. 93, Oct. 30, 1996.

Hamilton, JavaBeans, Sun Microsystems, Chapter 8, Aug. 8, 1997.

Reinhart, Liability Management: A new Tool for Financial Consultants, Financial Consultant, vol. 1, No. 3, p. 7-11, Fall/Winter 1996, ISSN 1091-644X, Dialog File 15, Accession No. 01395382.

OS/2EE Database Manager SQLJRA Remote Protocol, IBM Corporation, IBM TDB N10-93, p. 33-36, Jan. 1, 1993.

Quantitative Monitoring of Software Development by Time-Based and Intercheckpoint Monitoring, Software Engineering Journal, vol. 5, Iss. 1, p. 43-49, Abstract, Jan. 1990.

Basili et al., Understanding and Predicting the Process of Software Maintenance Releases, 18th International Conference on Software Engineering (ICSE '96), Mar. 25-29; p. 464; (Abstract).

Wohlin et al., Understanding the Sources of Software Defects: A Filtering Approach, 8th International Workshop on Program Comprehension (IWPC '00), p. 9, (Abstract), Jun. 10, 2000.

Pitt and McNiff, Java, RMI: the Remote Method Inovocation Guide, Addison Wesley Professional, ISBN: 0201-70043-3, Section 3.5, 3 pages, Jul . 2001.

* cited by examiner

| New Memo | Reply | Categorize | Forward | Delete | Folder | Copy into | Tools | Change Delete Date |

GCRM Development Team
Sent by: GCRM Development Team
10/20/2005 02:55 PM

To: Ramakrishnan X Vedanarayanan/JPMCHASE@JPMCHASE
cc:
Subject: Summary from GCRM Development Team You have been requested to perform the access certification duties as the Direct Manager (according to the Firm's HR database) for the User(s) listed at the bottom of the mail and respective operating system and or menu selections. Please note that the operating system is followed by the transaction (e.g., Read, Write) or menu level (e.g., m1-m8) access for that User.

It is our firm policy that we must certify system access at least once a year. If this certification is not completed properly, it can result in the system access for users.

The Reports Certification Engine is the tool you will use to confirm report access rights for your staff. Every effort has been made to make this process as simple as possible.

Within the Reports Certification Engine, you are given three options for each member of your staff who has access to the targeted applications.

a) Confirm continued access to ALL reports (and/or associated access levels)
b) Remove access to ALL reports (and/or associated access levels)
c) Confirm access for SOME of the reports and Remove access for SOME of the reports (and/Or associated access levels)

Once you have selected Option (a) or Option (c), the last step is to select the user's role. This is a required piece of information and is key to accurately completing the certification. THIS IS MANDATORY.

If you are selecting Option (b), then please provide the reason for access to be deleted.

You must complete the required certification by August 30, 2005.

Here is the certification link which can be used to confirm or remove access. The link also provides the capability to change direct managers or an alternate if there is a requirement to do so.

If you would like to perform the above actions personally, then please click on the link to begin : ☐
Please select one of the options below to begin the certification process:

△ <u>I will personally perform this required certification for my staff</u>
△ <u>I would like to delegate this required certification and will provide the email address (if known) of the individual</u>
△ <u>I am not the Direct Manager for the individual/s listed above and I would like to change the direct manager</u>
△ <u>I would like guidance and additional information OR I am experiencing problems with GCRM Certification Engine.</u>
△ <u>I would like to request NEW USER ACCESS to an application. I acknowledge that I still must complete required certification</u>

<u>User List: -</u>

Nagesh N Pai (Non-Privileged) --> Linux
Asha X Nanjundan (Non-Privileged) --> Solaris/UNIX

Figure 4D

INVESTMENT BANK — IB (Asia)

Certification Engine

CERTIFICATION

Direct Manager Section

- By Manager
- By User
- By User Type
- By Application

Categories: MANAGER | ALTERNATE | ADMIN | SECURITY | INFO | OWNER

| Manager | User | Application | User ID | Status | Application IDs | Action Taken |
|---|---|---|---|---|---|---|
| ▽TSSMM | | | | | | |
| | | | User ID0 | Un-Assigned | TSSMM ID0-TSSMM ID1-TSSM | No action taken |
| | | | | | | No action taken |
| | | | | | | No action taken |
| | | | | | | ccess removed from all |

Name List

| Name | Public Phone | Departm |
|---|---|---|
| A, Umair D. | | EHB EXC |
| Aadal, Therese A. | (631) 673-1487 | FUNDS G |
| Aalseth, Linda S. | | WHOLES |
| Aaltonen, Joumi J. | 44 1202 347452 | CASH MO |
| Aanand, Vijaya V. | 312-732-8563 | IOC OPEN |
| Aanchan, Supriya | | INTEL SE |
| Aaron, Angela C. | | MS FINAN |
| Aaron, Belynda L. | 817/884-4832 | CLS PRO |
| Aaron, Catherine M. | 302-2822718 | DE REMI |
| Aaron, Cynthia L. | (318) 699-4002 | POST CL |
| Aaron, Jonathan | (212) 834-7097 | TAX EXE |
| Aaron, Monet M. [No longer with | | EZ PAY S |
| Aaron, Niggi | 1-800-447-8766 | INTEL SE |

OK / Cancel

▽ Nagadevika Lokanath

*After that, the new Manager has to be selected from the drop down list*

| | | | | | | |
|---|---|---|---|---|---|---|
| | | | User ID0 | Certified | IWR ID0-IWR ID11 ID7-CFM ID9 | Access confirmed to all |
| | | | User ID1 | Certified | IWR ID16-IWR ID6-IWR ID7 ID14-CFM ID33 | Access confirmed to all |
| | | | User ID3 | Assigned | IWR ID8-IWR ID9 CFM ID5 | Access removed from all |
| | | | | | -CFM ID17 | Access removed from all |
| ▽TSSMM | | | | | | |
| | | | User ID19 | Assigned | TSSMM ID19 | Access removed from all |
| | | | | | | Access confirmed to (IWR ID16 |
| | | | | | | No action taken |
| | | | | | | No action taken |

EXIT

Figure 5C

| New Memo | Reply | Categorize | Forward | Delete | Folder | Copy Into | Tools | Change Delete Date |

GCRM Development Team
Sent by: GCRM Development Team
10/20/2005 03:47 PM

To: Ramakrishnan X Vedanarayanan/JPMCHASE@JPMCHASE
cc:
Subject: reminder mail from GCAM Development Team You have been requested to perform the access certification duties as the Direct Manager (according to the Firm's HR database) for the User(s) listed at the bottom of the mail and respective operating system and or menu selections. Please note that the operating system is followed by the transaction (e.g., Read, Write) or menu level (e.g., m1-m8) access for that User.

It is our firm policy that we must certify system access at least once a year. If this certification is not completed properly, it can result in the system access for users.

The Reports Certification Engine is the tool you will use to confirm report access rights for your staff. Every effort has been made to make this process as simple as possible.

Within the Reports Certification Engine, you are given three options for each member of your staff who has access to the targeted applications.

a) Confirm continued access to ALL reports (and/or associated access levels)
b) Remove access to ALL reports (and/or associated access levels)
c) Confirm access for SOME of the reports and Remove access for SOME of the reports (and/Or associated access levels)

Once you have selected Option (a) or Option (c), the last step is to select the user's role. This is a required piece of information and is key to accurately completing the certification. THIS IS MANDATORY.

If you are selecting Option (b), then please provide the reason for access to be deleted.

You must complete the required certification by August 30, 2005.

Here is the certification link which can be used to confirm or remove access. The link also provides the capability to change direct managers or an alternate if there is a requirement to do so.

If you would like to perform the above actions personally, then please click on the link to begin : ☐

Please select one of the options below to begin the certification process: ☐

△ I will personally perform this required certification for my staff
△ I would like to delegate this required certification and will provide the email address (if known) of the individual
△ I am not the Direct Manager for the individual/s listed above and I would like to change the direct manager
△ I would like guidance and additional information OR I am experiencing problems with GCRM Certification Engine.
△ I would like to request NEW USER ACCESS to an application. I acknowledge that I still must complete required certification User List :-

Naveen K Madala --->UNIX---/Solaris ---/Linux ---/Windows ---,
Ajay X Ganapule --->UNIX---/Solaris ---/Linux ---/Windows ---
Sangeetha V Chidambaram (Non-Privileged) --->Solaris---/UNIX ---
Netra X Kumar (Non-Privileged) --->Solaris---/Windows ---,
Lakshmi X Ayalur (Non-Privileged) --->Linux---/Windows ---

Figure 6A

INVESTMENT BANK

Operating System Certification

ChangeStatus

| Mail Type | Direct Manager Name | Status | Date Sent |
|---|---|---|---|
| ▼ Reminder Mail | | | |
| | Vinay K Prabhu | Send | 10/20/2005 03:·: |
| | Nagadevika X Lokanath | Send | 10/20/2005 03:·: |
| | Ajith X Pai | Send | 10/20/2005 03:·: |
| | Sridhar X Reddy | Send | 10/20/2005 03:·: |

An agent which is scheduled for every 30 min is going to run on all the records whose status is set to "Schedule" and mails will be sent. The status will now change to "Send" and also date and time stamp is shown.

MANAGER   ALT MGR   ADMIN   OS MGR   REVIEWERS

INSTRUCTIONS

To begin the process :

>> If you are a DIRECT MANAGER, click on MANAGER button in the right

>> If you are an ALTERNATE MANAGER, click on ALTERNATE MANAGER button in the right

SUPPORT

- Support Contact Info

EXIT

Figure 6D

INVESTMENT BANK
IB (Asia)

Certification Engine

House-Keeping

Scheduling Status
- Mail to Manager
- Mail to Information Owner

- Data Import Configuration
- Application Configuration
- Transaction Configuration
- Role Configuration
- Mail Configuration

ADMIN | MANAGER | ALTERNATE | SECURITY | INFO O...

CERTIFICATION >>

EXIT

★ Expand All   ★ Collapse All

| Application | Information Owner | Status | Date |
|---|---|---|---|
| CFM | Saroj K Tripathy/JPMCHASE | Send | 10/07/2005 07:28:17 PM |
| EI | Sowntharya L Natarajan/JPMCHASE | Send | 10/07/2005 07:28:19 PM |

The mail is sent to the Information Owners after an agent which is scheduled for every 30 min is executed. Then the status will change to "Send" and also date and time stamp is shown.

INVESTMENT BANK

Operating System Certification

▽ Expand All  △Collapse All  + Select All  ▬De-select All  X Confirm Deletion  ✓ Re-instate Access

| Operating System | Access Level | User | Status | IRM Name |
|---|---|---|---|---|
| ▽ Solaris | | | | |
| | ▽ Read | | | |
| | | Asha X Nanjundan | Deleted by IRM | Ramakrishnan |

*If the Security admin feels that a particular user's access has to be reinstated he has to click here*

CERTIFICATION

Security Admin Section

Access Deleted Records

- By Operating System
- By User
- By Manager

- Access Retained Records »
- Pre-Deleted Records »

SECURITY / MANAGER / MGR OS / MGR / ADMIN / REVIEWER

EXIT

APPLICATIONS ACCESS RE-CERTIFICATION SYSTEM

CROSS REFERENCE TO RELATED APPLICATION

The present invention claims priority to U.S. Provisional Applications No. 60/741,044 filed on Dec. 1, 2005, the contents of which are incorporated herein by reference in their entirety.

FIELD OF THE INVENTION

The present invention relates to a system which automatically approves and re-certifies a user's access rights to applications in an institution's computer system.

BACKGROUND OF THE INVENTION

As economy increasingly globalizes, more and more corporations operate internationally. People from different sections of a corporation access and share various kinds and levels of information such as from basic software to advanced applications (e.g., intellectual properties, production process, and database). These corporations are thus required to have a capacity of effectively maintaining the information and managing the access process to ensure that a qualified user accesses appropriate information. In addition, since security of the information is critical to commercial success of these corporations, how to protect them from potential commercial crimes becomes a challenge.

However, currently most corporations do not have a systematic methodology and automatic procedures to approve and re-certify a user's access rights to applications in their computer system. Besides, when a user needs to access different applications, he is usually required to apply multiple IDs, which is labor-intensive in servicing a global business community. Furthermore, when a user leaves his job, his access rights are often not terminated timely. Also, when a user' functional roles change, his access rights are often not adjusted correspondingly.

Hence, in order to effectively protect information in an institution's computer system and meet access needs of a global business community, there is a need to establish a methodology and system for access rights re-certification to ensure that the information in the institution's computer system is accessed by an appropriate user.

SUMMARY OF THE INVENTION

Therefore, an object of the present invention is to build up an integrated system for approving and re-certifying (including renewing, or modifying, or canceling) a user's access rights to appropriate levels and parts of applications stored or existing in an institution's computer system (e.g., a large corporate computer system) based on reviewing in a configurable timeframe the user's functional roles by designated reviewers (e.g., user's supervisor or manager, or delegated responsible representative), which avoids the aforementioned disadvantages of the prior art.

Another object of the present invention is to ensure security of the applications stored or existing in the institution's computer system by means of a reviewing process (including renewing, modifying, and canceling a user's access rights) in a configured timeframe, based on a user's updated functional roles.

A further object of the present invention is to automate the re-certification process by means of a computer-controlled re-certification system which automatically operates in a defined methodology under control of re-certification administrators.

Yet another object of the present invention is to develop a management summary of access rights to the applications, and a automated scorecard to monitor the re-certification progress.

A still further object of the present invention is to develop a control process to ensure that changes to existing permissions are effectively managed at source destinations.

A yet further object of the present invention is to develop a capability of initiating multiple approvers for re-certifying a user's access rights.

In accordance with an aspect of the present invention, a method of approving and re-certifying a user's access rights to applications in an institution's computer system serves to first define and input the user's functional roles into a re-certification system by an administrative entity, which are then converted to some established system rules including assignment of the corresponding allowable levels or parts of applications stored or existing in an institution's computer system to the user, and setup of a methodology (e.g., configuring a re-certification timeframe for this user, and designating a reviewer) for a re-certification process for each user.

In accordance with another aspect of the present invention, a method of approving and re-certifying a user's access rights to applications in an institution's computer system serves to notify a user's designated reviewer in a configured timeframe to remind him of carrying out a re-certification process for the user.

In accordance with a further aspect of the present invention, a method of approving and re-certifying a user's access rights to applications in an institution's computer system serves to enable a reviewer to renew or remove a user's access rights, or modify including adding or removing some applications, and change reviewer.

In accordance with a yet another aspect of the present invention, a method of approving and re-certifying a user's access rights to applications in an institution's computer system serves to request permissions of access rights to some applications from applications' owners.

In accordance with a still further aspect of the present invention, a method of approving and re-certifying a user's access rights to applications in an institution's computer system serves to enable a security administrator to remove or re-instate a user's access rights based on the results of re-certification process.

The above and other objects and features of the present invention will be apparent in the following detailed description of the present invention when read in conjunction with the accompanying drawings.

BRIEF DESCRIPTION OF THE DRAWINGS

In order to facilitate a fuller understanding of the present invention, reference is now made to the accompanying drawings. These drawings should not be construed as limiting the present disclosure, but are intended to be exemplary only.

FIGS. 4A-4D are diagrams illustrating an embodiment of sending a message to a user's reviewer by a re-certification system.

FIGS. 5A-5C are diagrams illustrating an embodiment of changing a user's reviewer by the user's original reviewer.

FIGS. 6A-6D are diagrams illustrating an embodiment of sending a reminder message to a user's reviewer by a re-certification system.

FIGS. 8A-8E are diagrams illustrating an embodiment of approving/rejecting a user's access rights to some applications by an application owner.

FIGS. 9A-9E are diagrams illustrating an embodiment of re-installing a user's access rights to applications by a security administrator.

DETAILED DESCRIPTION OF THE INVENTION

Figure 1:
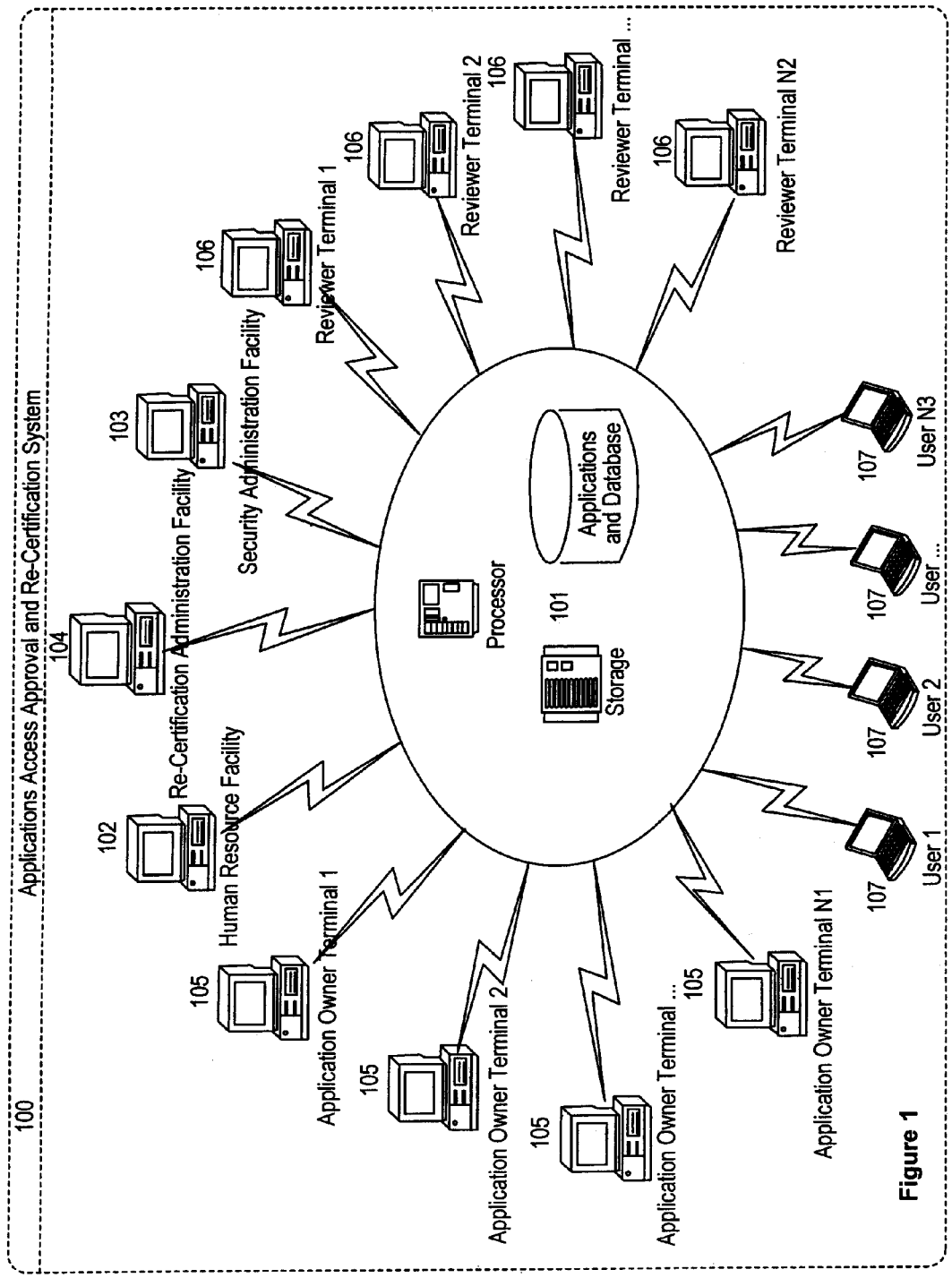
FIG. 1 is a block diagram illustrating an embodiment of an applications access approval and re-certification system.

FIG. 1 is a block diagram illustrating an embodiment of an applications access approval and re-certification system (hereafter refer to as "re-certification system") 100. The re-certification system comprises a central facility 101, a human resource facility 102, a security administration facility 103, a re-certification administration facility 104, application owner terminals 105, reviewer terminals 106, and user terminals 107. According to one approach, the human resource facility, the re-certification facility, and the security administration facility can be one or several terminals which are used specifically for re-certification purpose. According to another approach, they can be terminals which perform function as a human resource department terminal, a re-certification administration terminal, and a security administration terminal during the re-certification process as well as general user terminals. Likewise, an application owner terminal or a reviewer terminal can be a general terminal which performs a function as an application owner or a reviewer as well as a user terminal. A central facility operates and controls an institution's computer system, which comprises suitable hardware and software such as communication interfaces, processors, and storage devices. The re-certification administration facility communicates with the human resource facility, the security administration facility, the application owner terminals, the reviewer terminals, and the user terminals through the institution's computer system.

It should be understood that the specific hardware and software used in the re-certification system is not critical to the present invention, and one of ordinary skills in the art will readily appreciate variations in hardware and software configurations that are suitable. Additionally, electronic communications during a re-certification process manipulated by the re-certification system may comprise only data or selected choice entered into predefined fields of a template.

Figure 2:
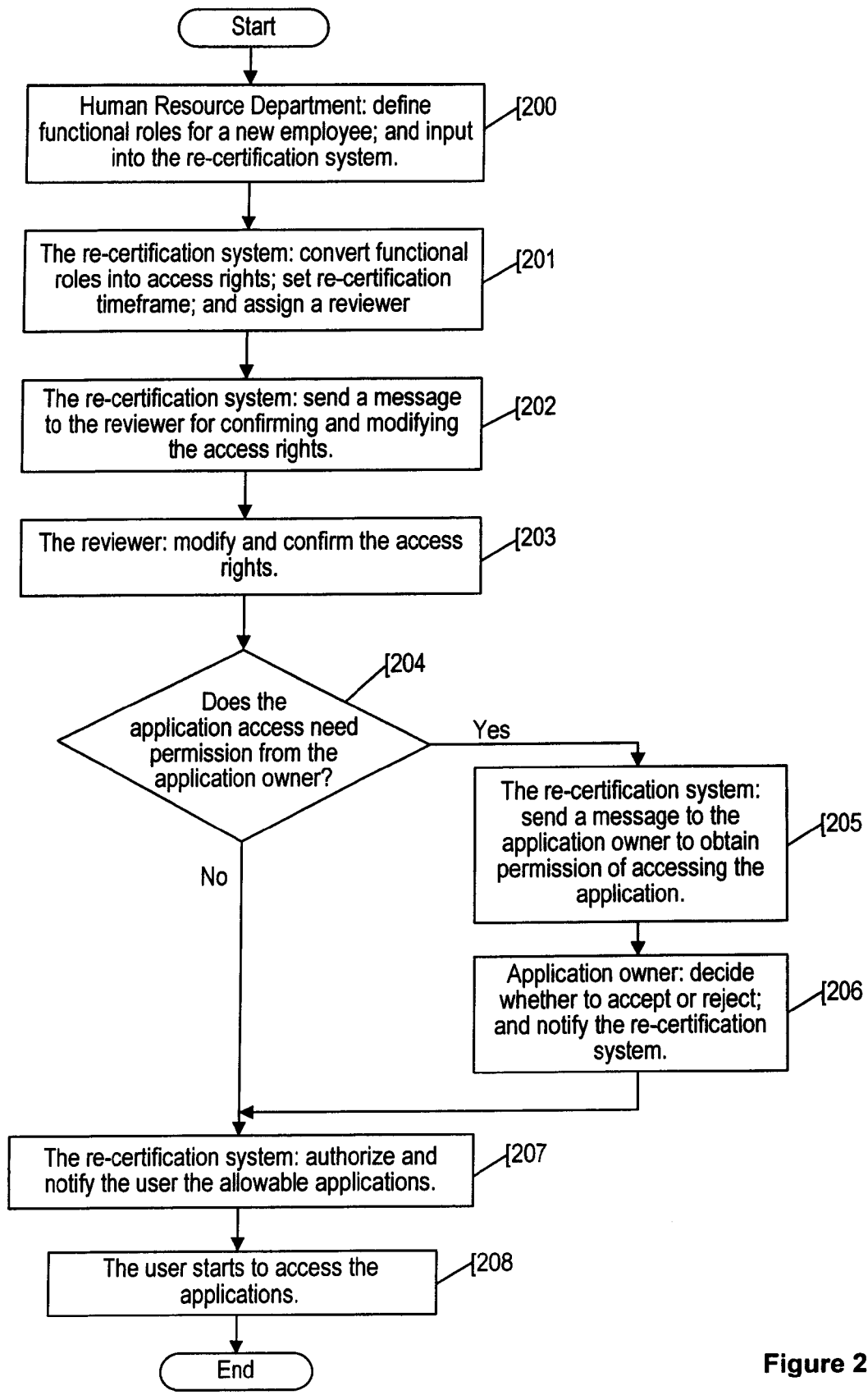
FIG. 2 is a flowchart showing an approval process of a user's access rights to applications in an institution's computer system by a re-certification system according to one embodiment of this invention.

FIG. 2 is a flowchart showing a approval process of a user's access rights to applications in an institution's computer system by a re-certification system in accordance with one embodiment of the present invention. When a new employee starts his job in an institution, the human resource department will define his functional roles and input data representing his functional roles into the re-certification system 200. The institution can be any organized entity, such as a bank, a corporation, a government department, or a hospital. In order to carry out these functional roles, the new employee needs to access appropriate levels and parts of applications stored or existing in the institution's computer system. The application could be but not limited to operating systems, software, or advanced applications such as intellectual properties, production process, and database. Based on established rules, the re-certification system converts these functional roles into access rights, i.e., a list of applications the user can access 201. In the meantime, a re-certification timeframe which is a schedule of performing a re-certification process and a reviewer who will perform the re-certification process for the user are also assigned. The reviewer could be the user's supervisor, or his manager, or a delegated responsible representative. The representative could be appointed by the user's supervisor or manger, or the re-certification administrator. A message containing the list of allowable applications based on the user's functional roles is sent to the user's reviewer for modification and confirmation 202. There is a link in the message to the user's re-certification profile which enables the reviewer to remove or add accessible applications, change the re-certification timeframe, and delegate a representative to perform the re-certification process for this user 203. For some application which requires its application owner to decide whether to allow the user to access this specific application 204, the re-certification system sends a message to the application owner for confirmation 205. If the application owner accepts this request, the user can access this specific application. If the application owner rejects the request, the user doesn't have the access right for this application. The application owner sends his decision to the re-certification system 206. The re-certification system then reconfigure the user's access rights profile, initiate the access, and notify the user the allowable applications 207. Thereafter, the user has the authority to access the assigned domain in the institution's computer system 208.

Figure 3A:
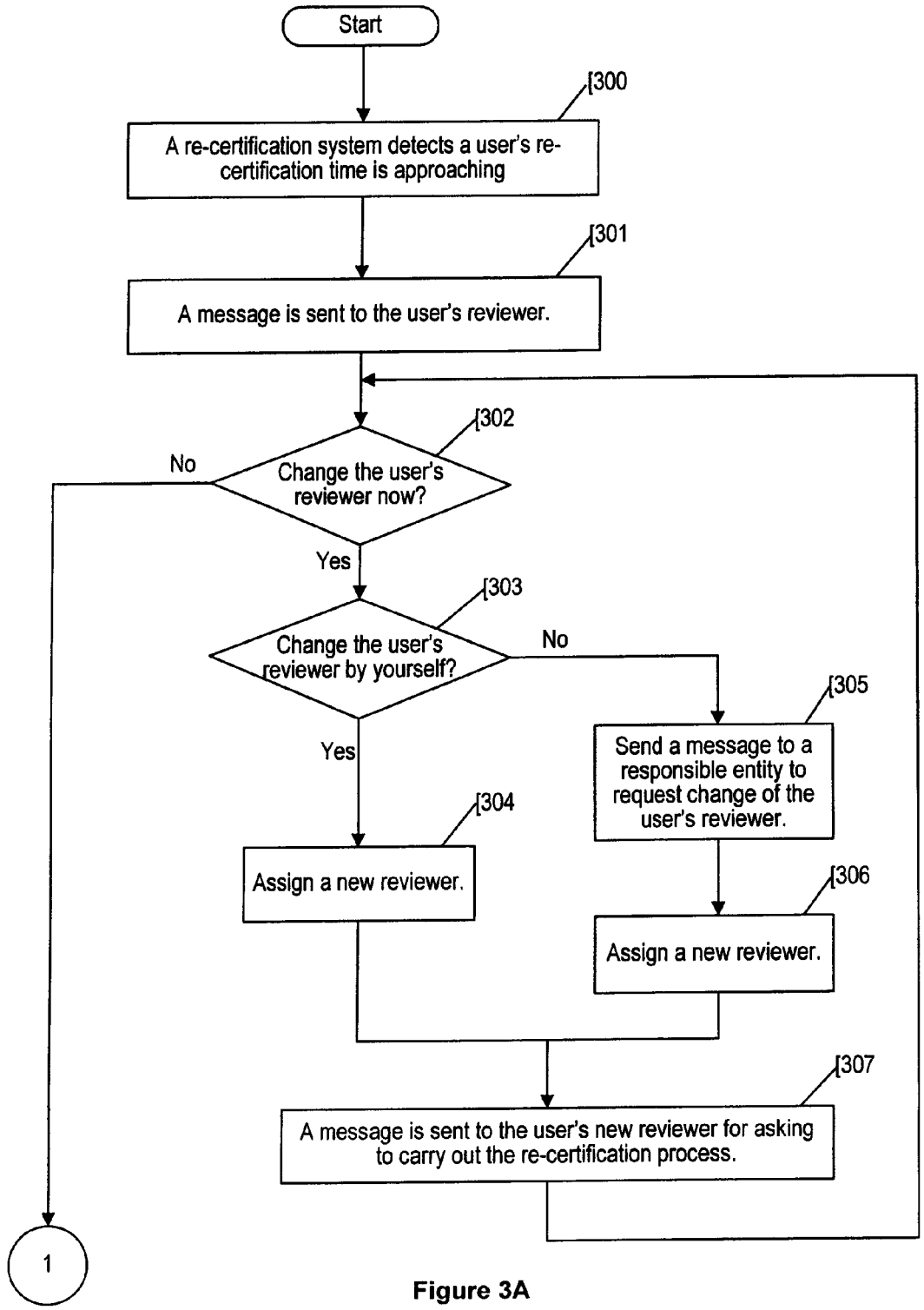
FIGS. 3A-3C are a flowchart showing a re-certification process of a user's access rights to applications in an institution's computer system according to one embodiment of this invention.
Figure 3B:
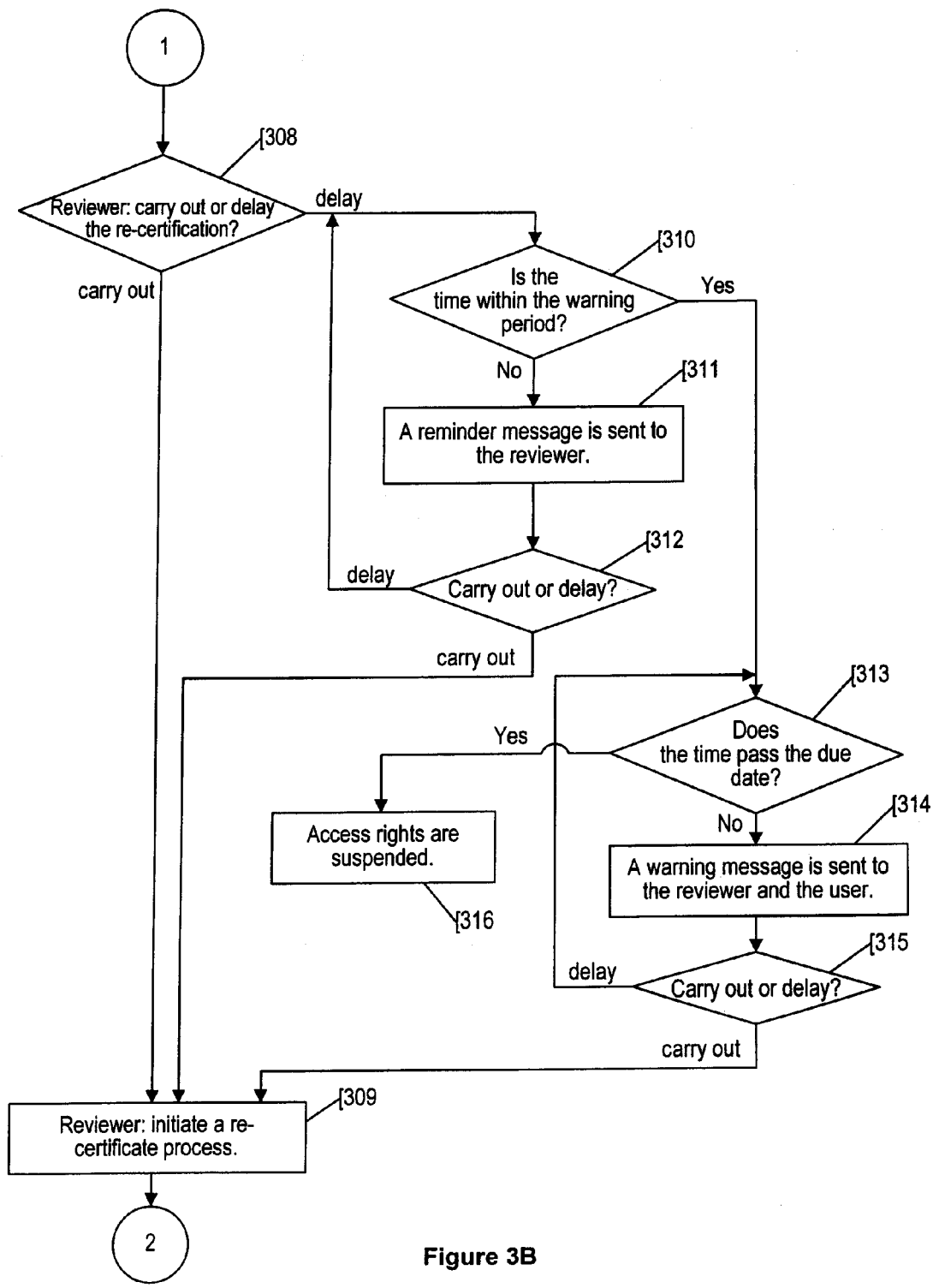
Figure 3C:
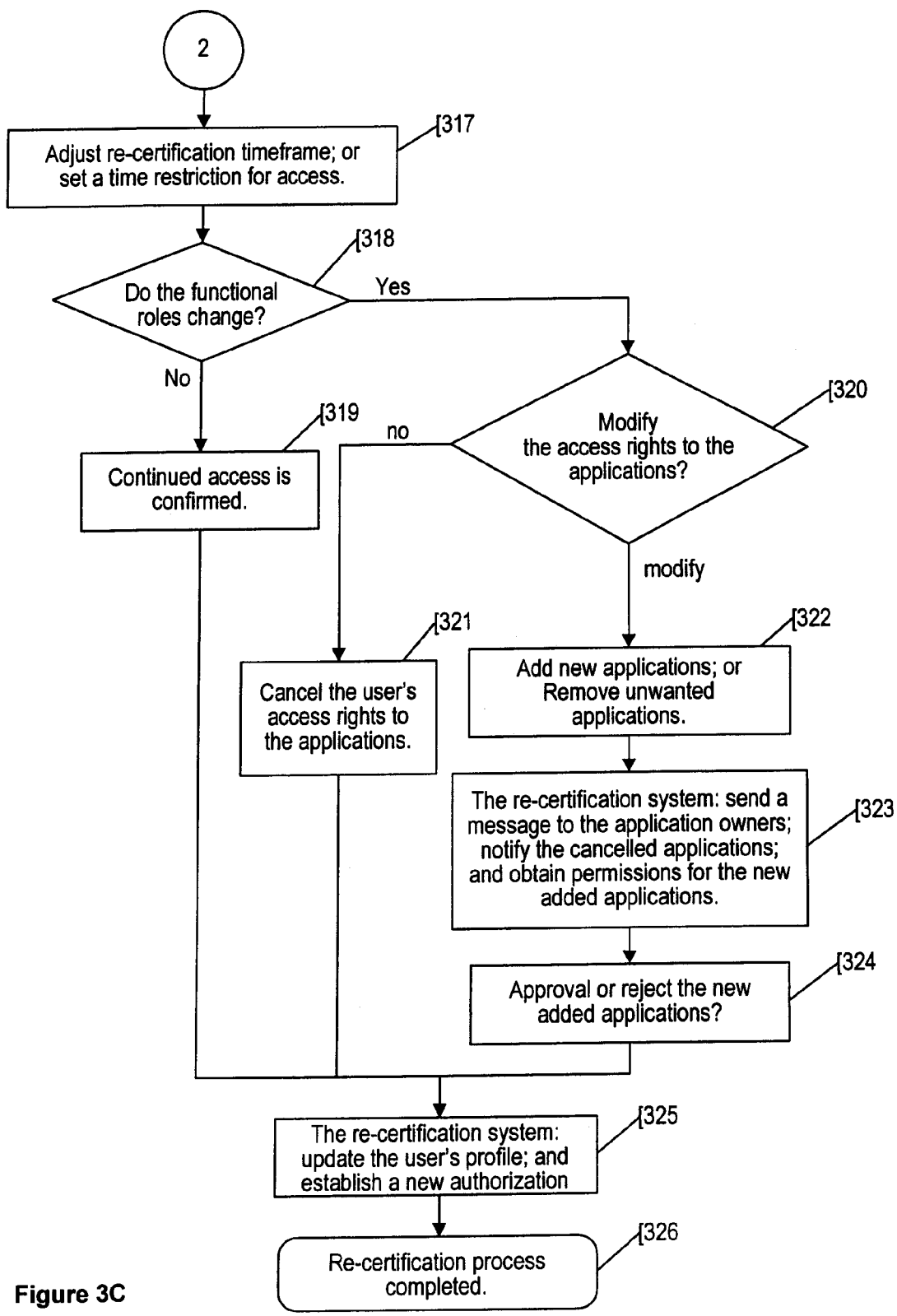
Figure 4A:
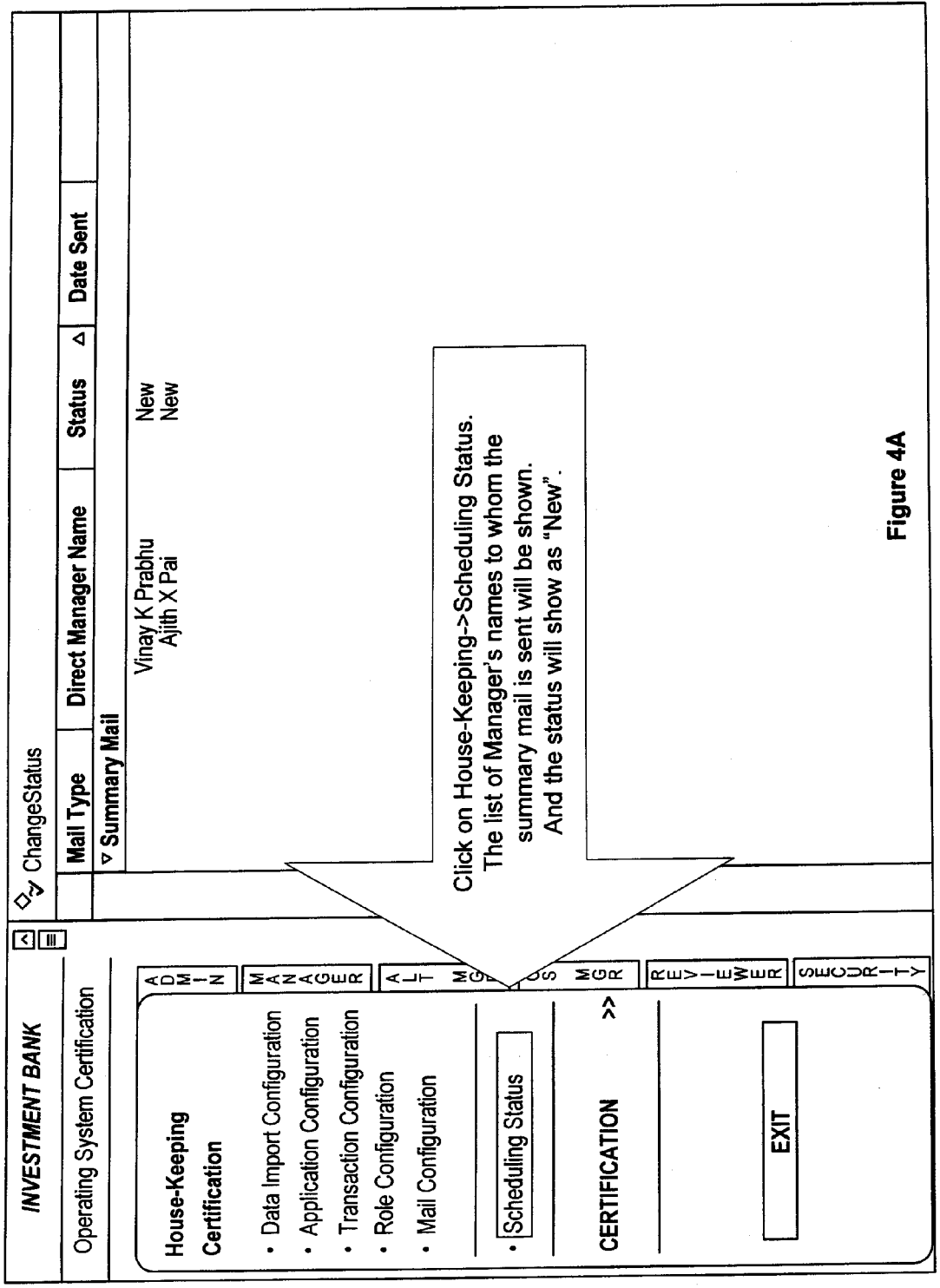
Figure 4B:
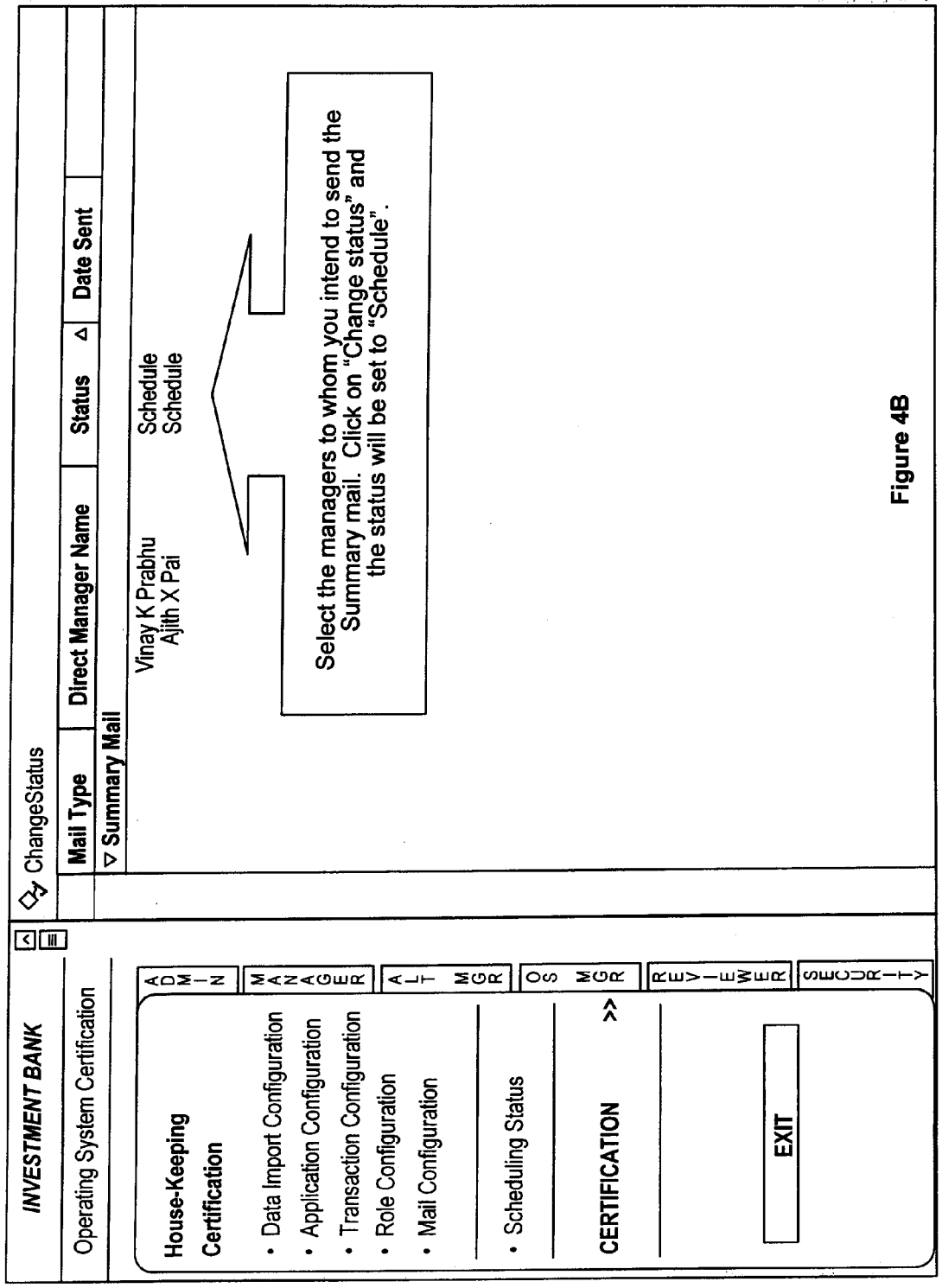
Figure 4C:
Figure 5A:
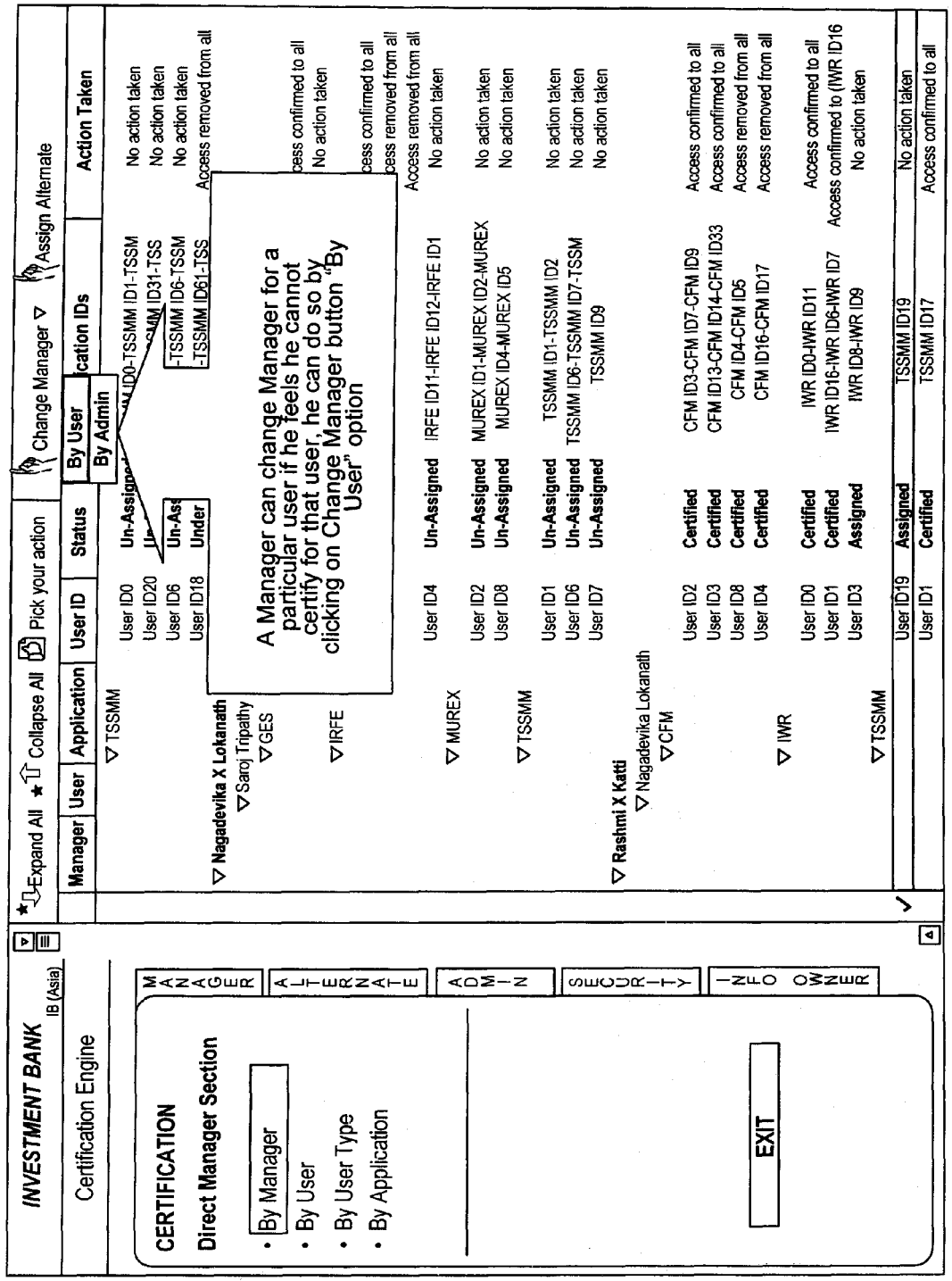
Figure 5B:
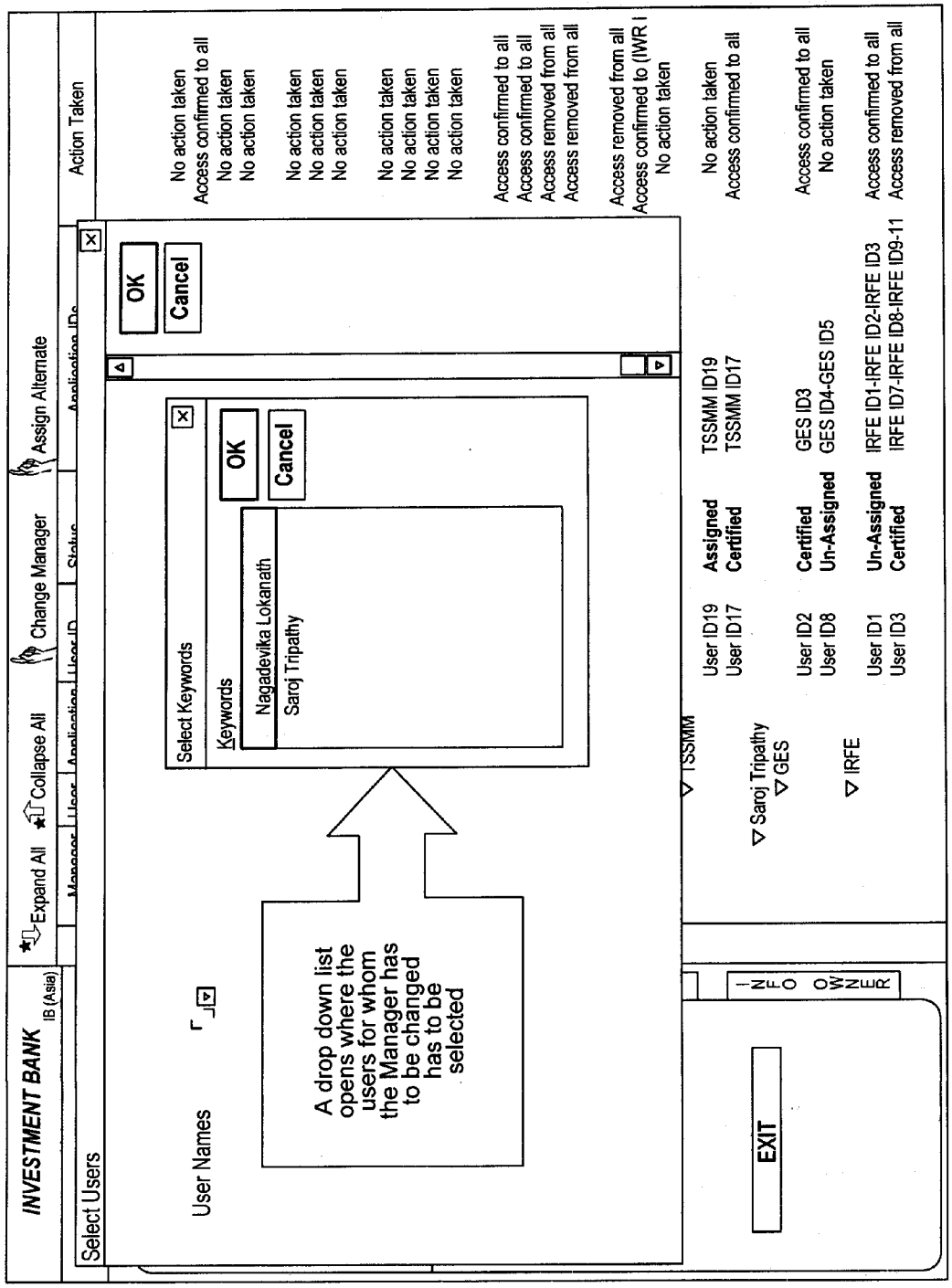
Figure 6B:
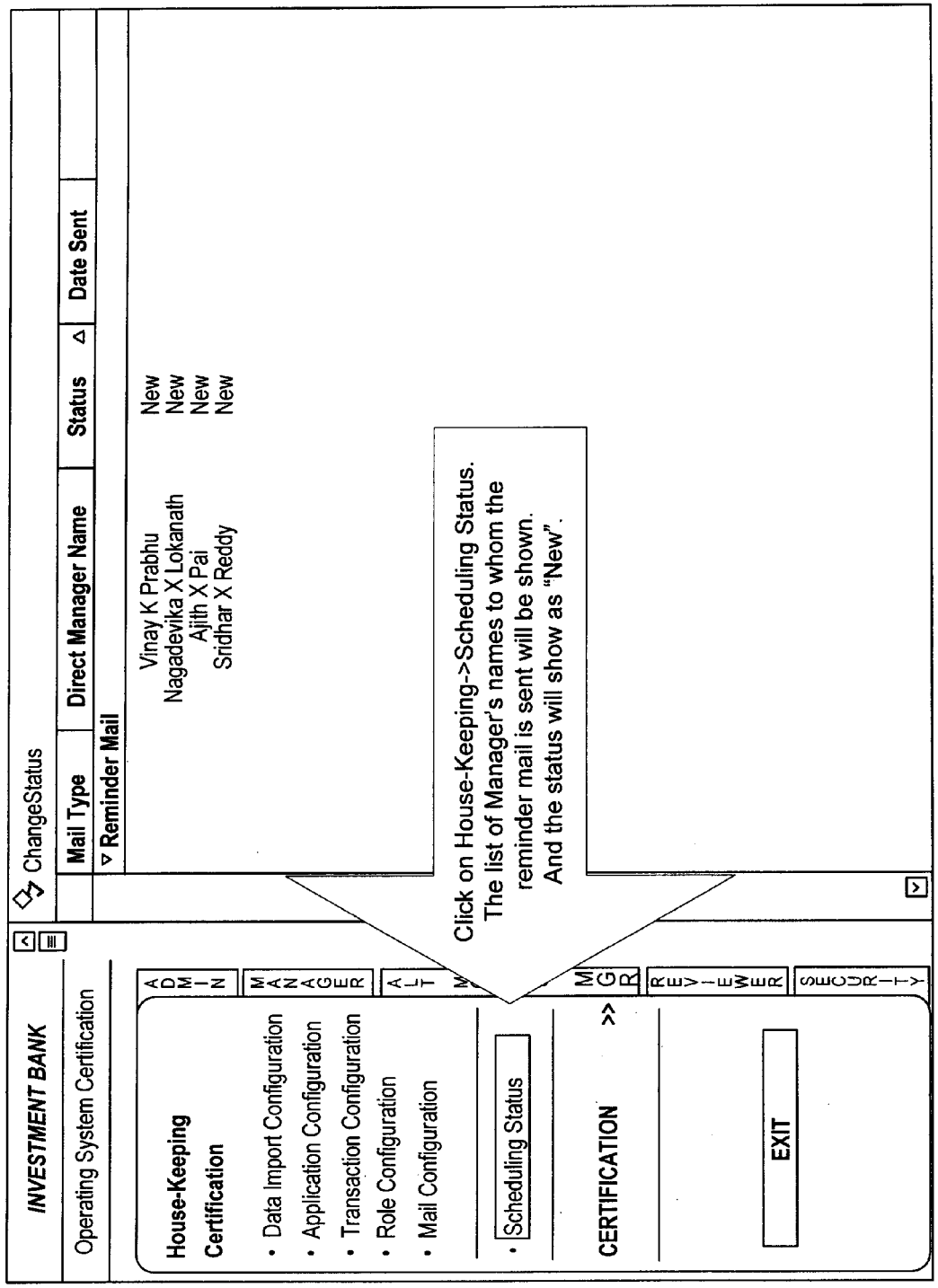
Figure 6C:
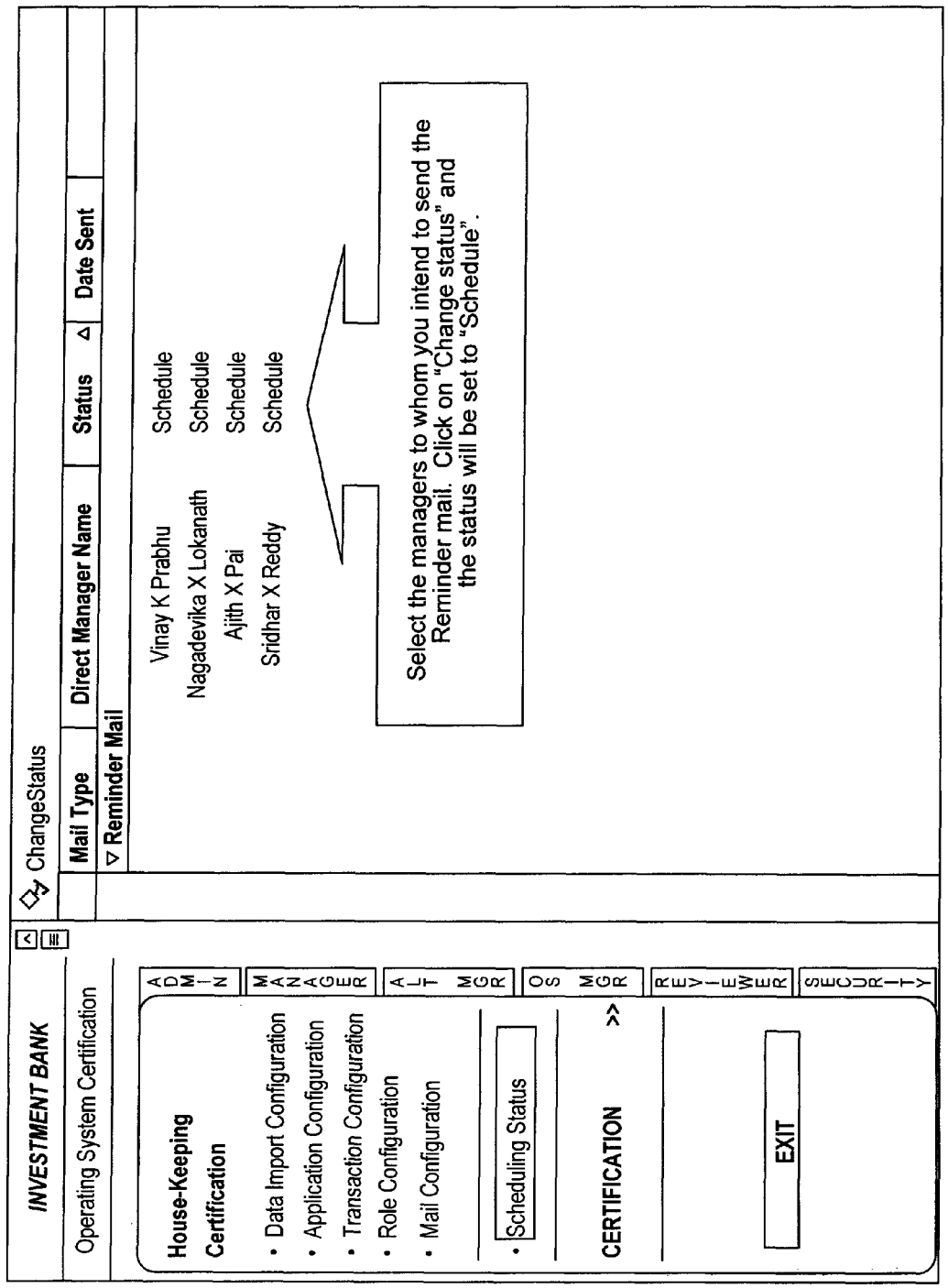
Figure 7A:
FIGS. 7A-7B are diagrams illustrating an embodiment of sending a warning message to a user and the user's reviewer by a re-certification system.
Figure 7B:
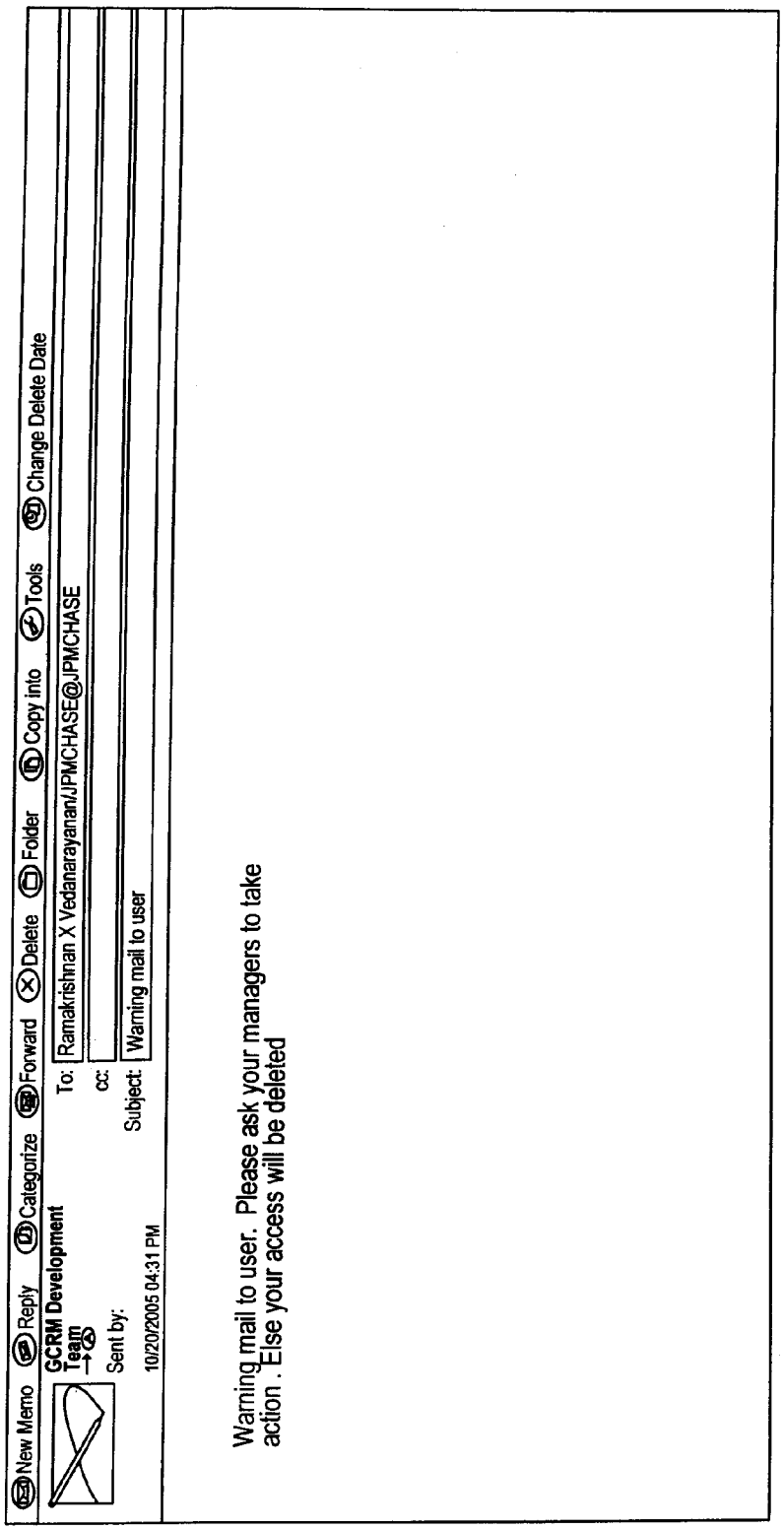

FIGS. 3A-3C are a flowchart showing a re-certification process of a user's access rights to applications in an institution's computer system in accordance with one embodiment of the present invention. FIGS. 4A-4D are diagrams illustrating an embodiment of sending a message to a user's reviewer by a re-certification system. FIGS. 5A-5C are diagrams illustrating an embodiment of changing a user's reviewer by the user's original reviewer. FIGS. 6A-6D are diagrams illustrating an embodiment of sending a reminder message to a user's reviewer by a re-certification system. FIG. 7A-7B are diagrams illustrating an embodiment of sending a warning message to a user and the user's reviewer by a re-certification system. FIGS. 8A-8E are diagrams illustrating an embodiment of approving/rejecting a user's access rights to some applications by an application owner. FIGS. 9A-9E are diagrams illustrating an embodiment of re-installing a user's access rights to applications by a security administrator. The method of FIGS. 3A-3C are described in connection with FIGS. 4A-4D, FIGS. 5A-5C, FIGS. 6A-6D, FIGS. 7A-7B, FIGS. 8A-8E, and FIGS. 9A-9E in order to set forth the method in a concrete fashion easily understood by the person of ordinary skills. However, this articulation of the method is exemplary only, and the method could be implemented different from those of FIGS. 4A-4D, FIGS. 5A-5C, FIGS. 6A-6D, FIGS. 7A-7B, FIGS. 8A-8E, and FIGS. 9A-9E.

As set forth in FIG. 3A, when a re-certification system detects the time for a user's re-certification is approaching 300, it will send a message to the user's reviewer some time (e.g., one or two months) prior to the due date 301 (e.g., as shown in FIGS. 4A-4D). The message is used to inform the reviewer that a re-certification process for the user can be performed. According to one approach, the message can be sent automatically by the system. According to another approach, the message can be sent by a re-certification administrator. When the reviewer receives this message, he may decide whether to change the user's reviewer 302. If yes, the reviewer needs to decide whether he wants to change it by himself 303. If he chooses to do it by himself, he will assign a new reviewer 304 (e.g., as shown in FIGS. 5A-5C). If he chooses not to do it by himself, a message will be sent to a responsible entity which can be the human resource department or the re-certification administrator, to request a change 305. The responsible entity will then assign a new reviewer 306. After the new reviewer is assigned, the new reviewer is notified by a message to re-initiate a new re-certification process for the user 307. The new reviewer could be the user's new supervisor, or his new manager, or a delegated representative, or a re-certification administrator.

As shown in FIG. 3B, if the reviewer chooses to perform the re-certification for the user by himself, he needs to decide whether to carry out the re-certification process right away or temporarily delay it 308. If he decides to carry out the re-certification process for the user right away, according to one approach, he may initiate it by clicking a link to the re-certification system within the received message 309 (e.g., as shown in FIG. 4D). According to another approach, he may start the re-certification process by accessing a website designed for the process. If he decides to temporarily delay the re-certification, the re-certification system will decide whether it is within a warning period (e.g., two weeks prior to the re-certification due date) 310. If not, the re-certification system will send a reminder message with a configured frequency (e.g., once a day) to the reviewer to remind him of carrying out the process 311 (e.g., as shown in FIG. 6A). According to one approach, the re-certification system may automatically send the reminder message. According to another approach, the re-certification administrator may schedule to send it (e.g., as shown in FIGS. 6B-6D). Within a configured timeframe, sending a reminder message continues until the reviewer carries out the re-certification process 312. When it is within the warning period, the re-certification system will decide whether it passes the due date 313. If not, a warning message is sent to both the reviewer (e.g., as shown in FIG. 7A) and the user (e.g., as shown in FIG. 7B) to notify the reviewer and the user that access rights of the user to the applications will be suspended if the reviewer will not carry out the re-certification by the due date 314. Within a configured timeframe, sending a warning message continues until the reviewer carries out the re-certification process 315. When the warning time is over, if the reviewer did not perform the process, the re-certification system automatically suspends the user's access rights to the applications 316. According to another approach, the re-certification administrator may send a message to a security administrator for requesting to suspend the user's access rights.

Figure 8A:
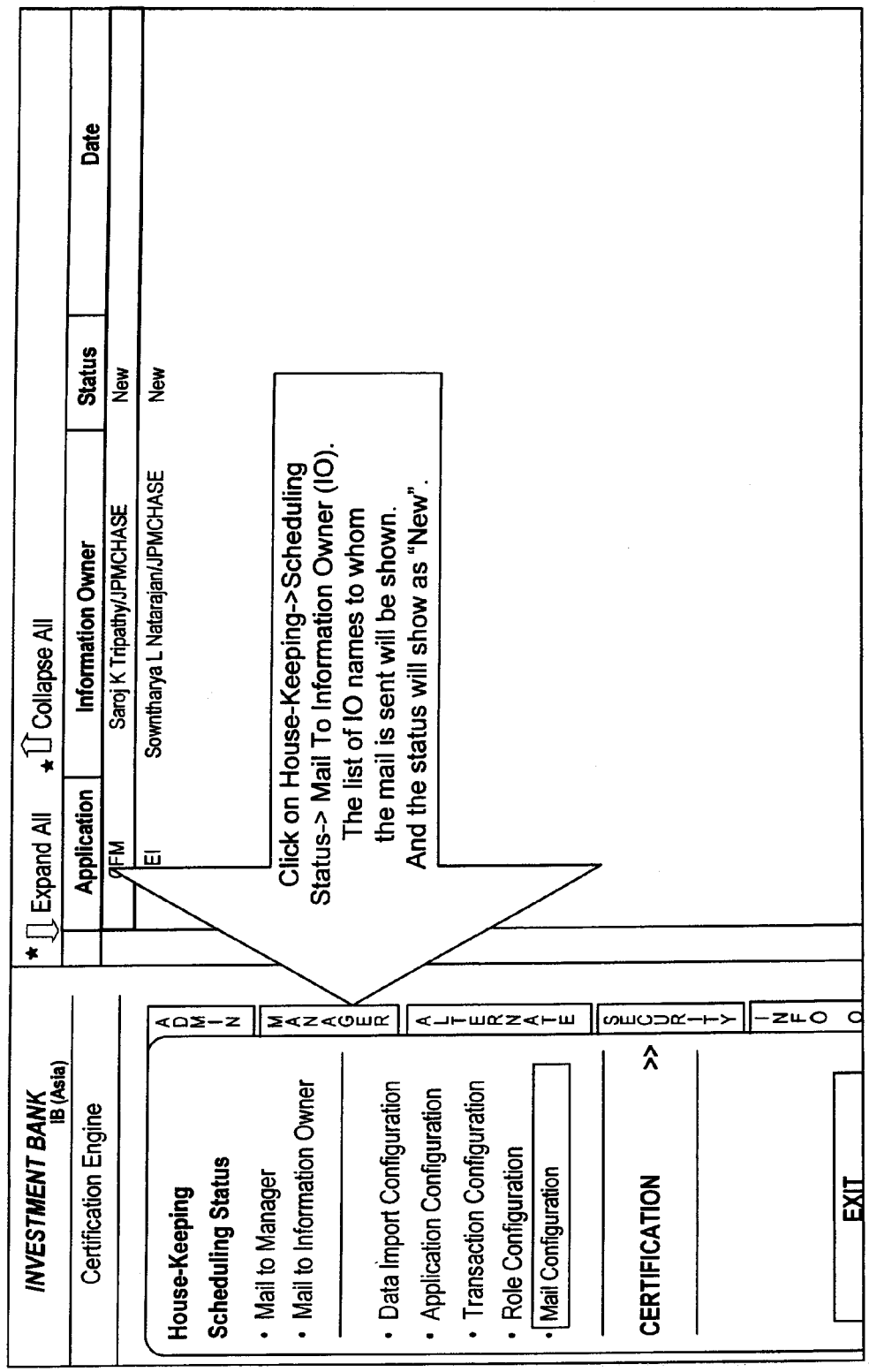
Figure 8C:
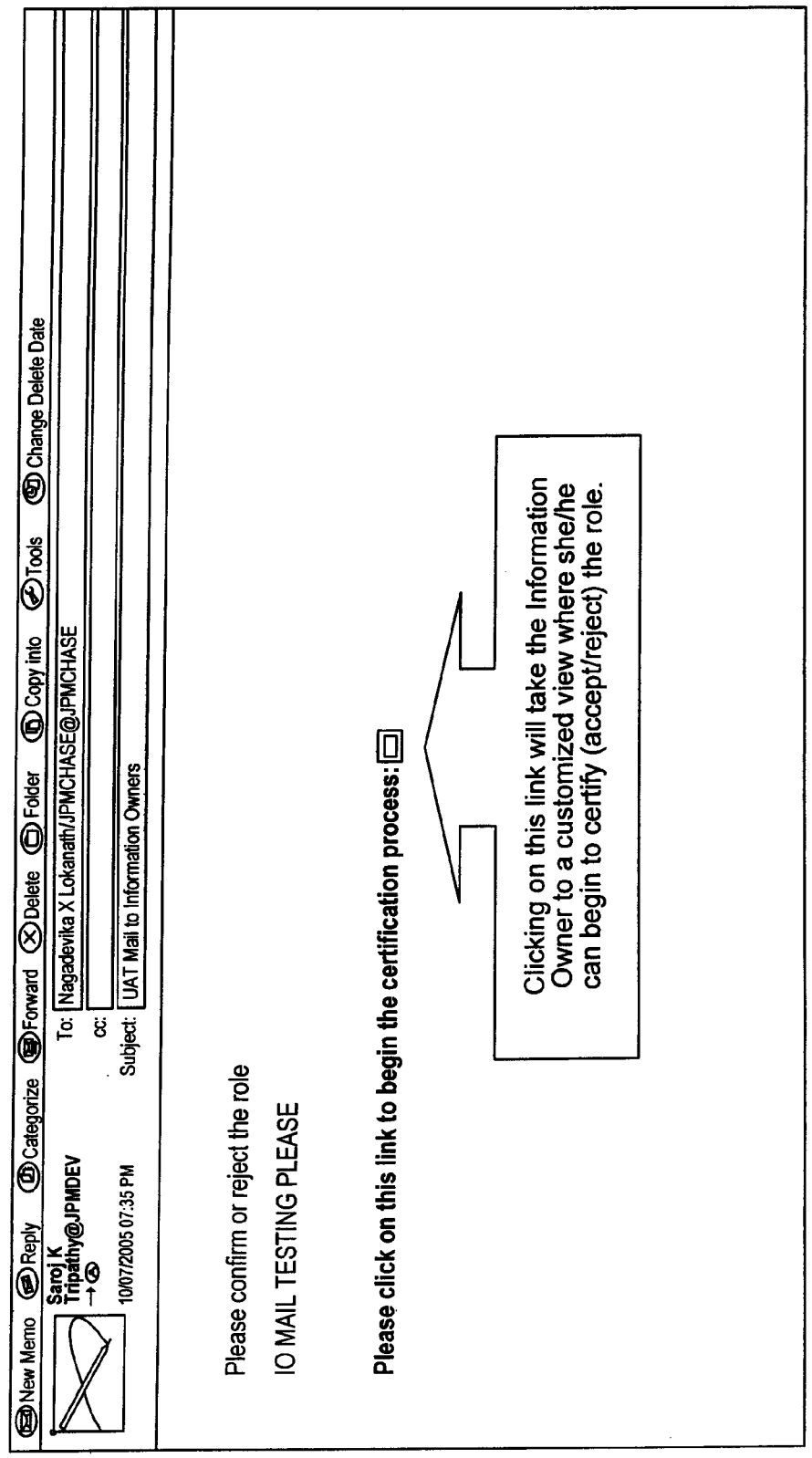
Figure 8D:
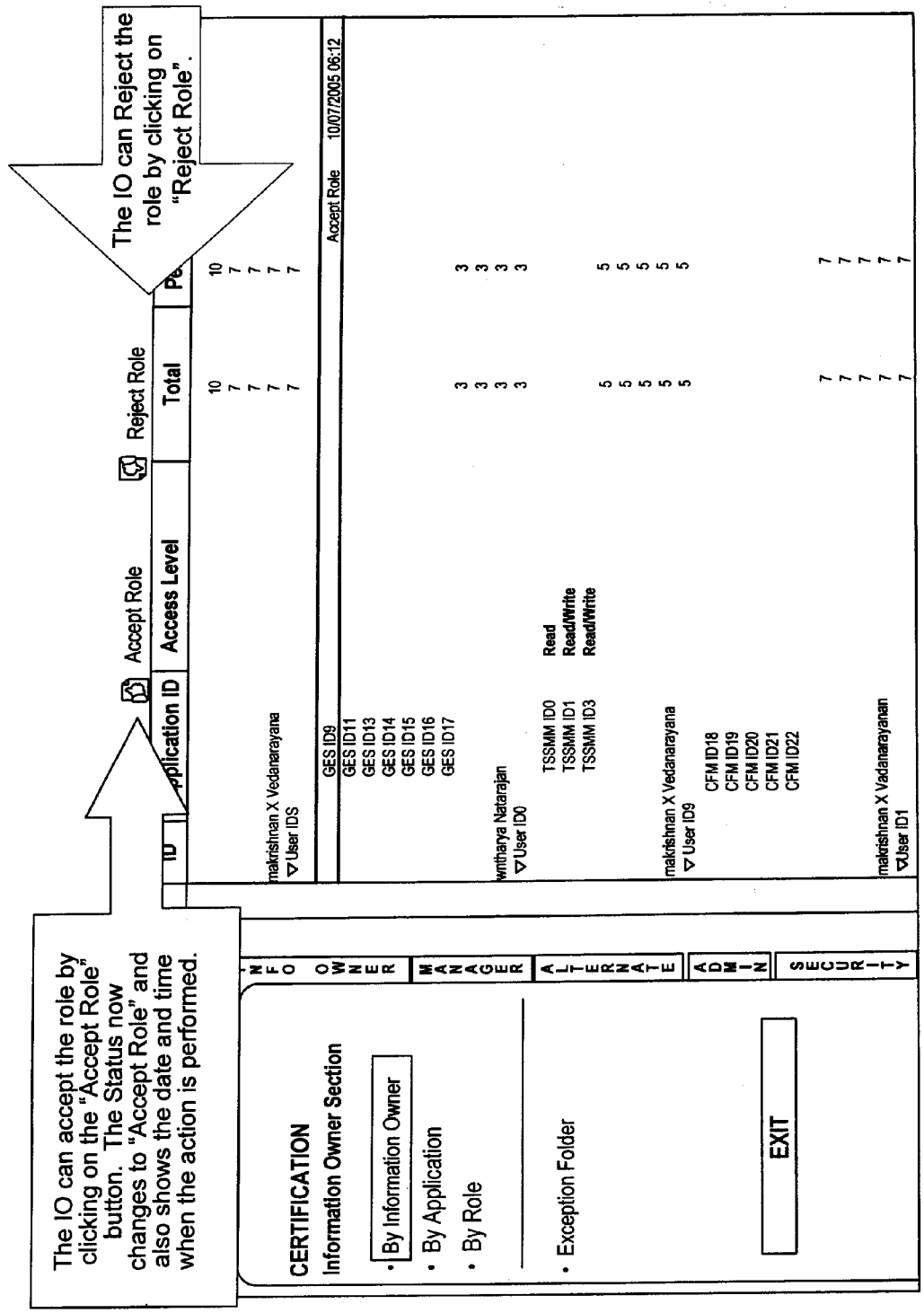
Figure 8E:
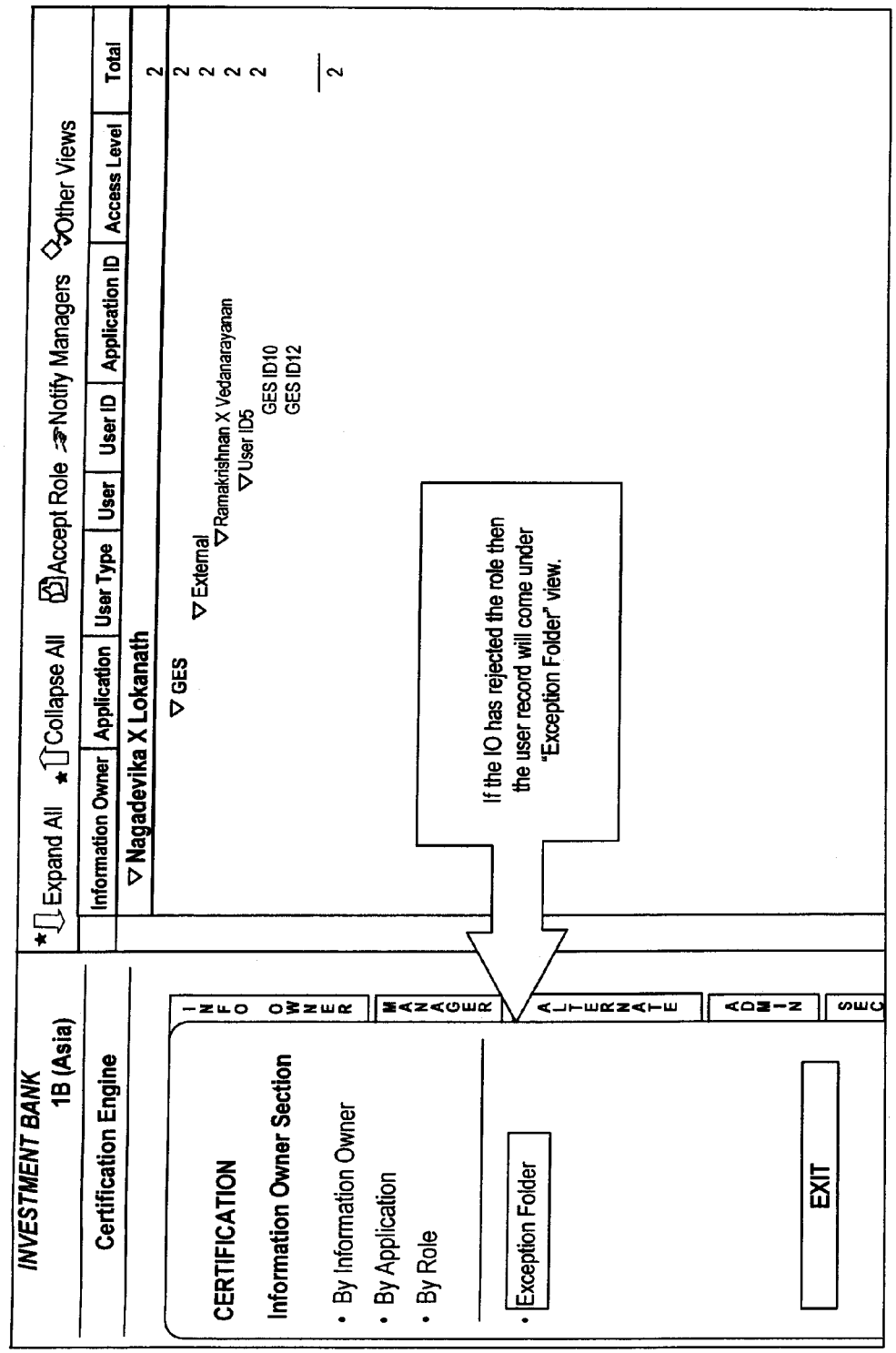
Figure 9B:
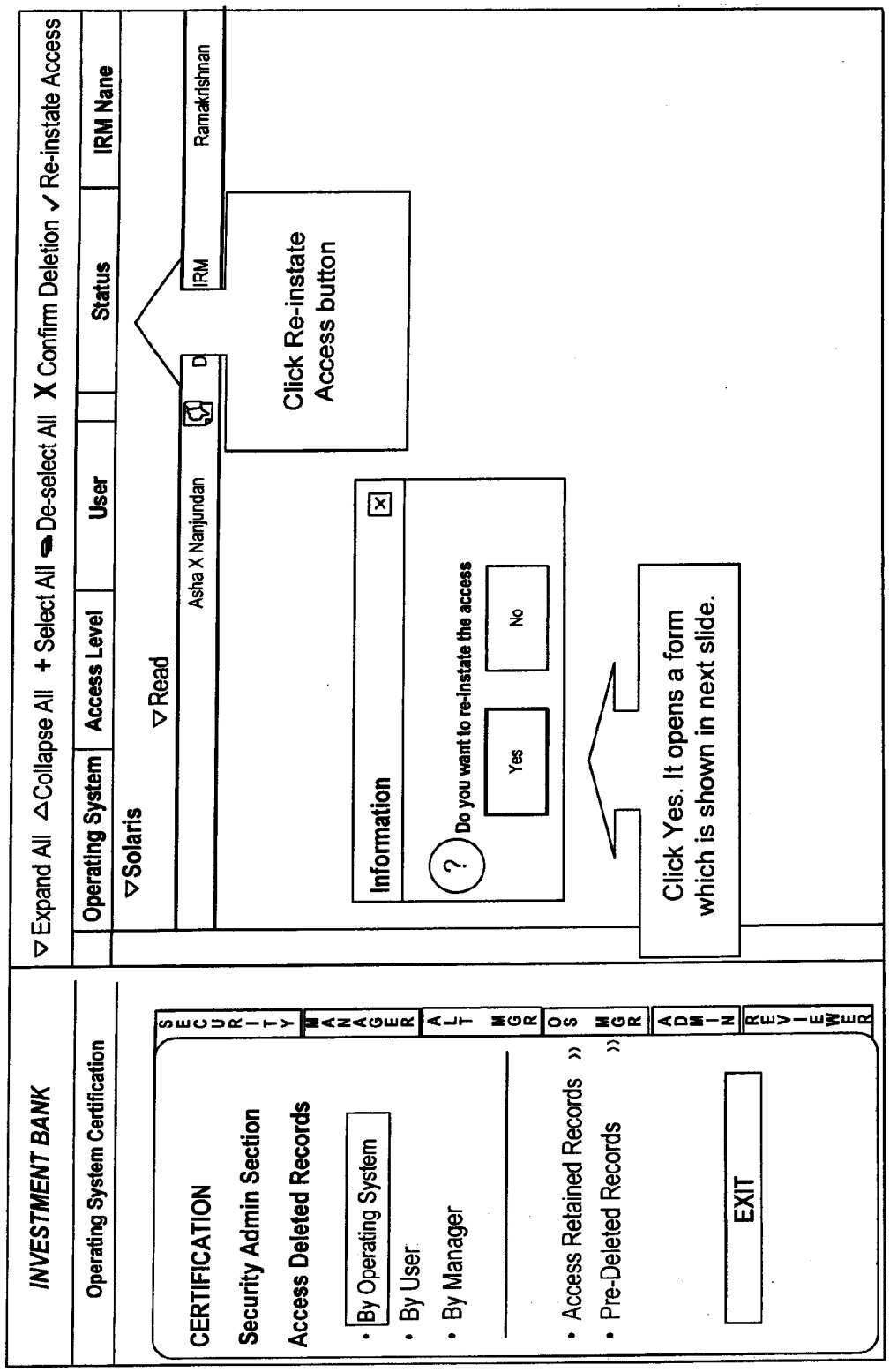
Figure 9C:
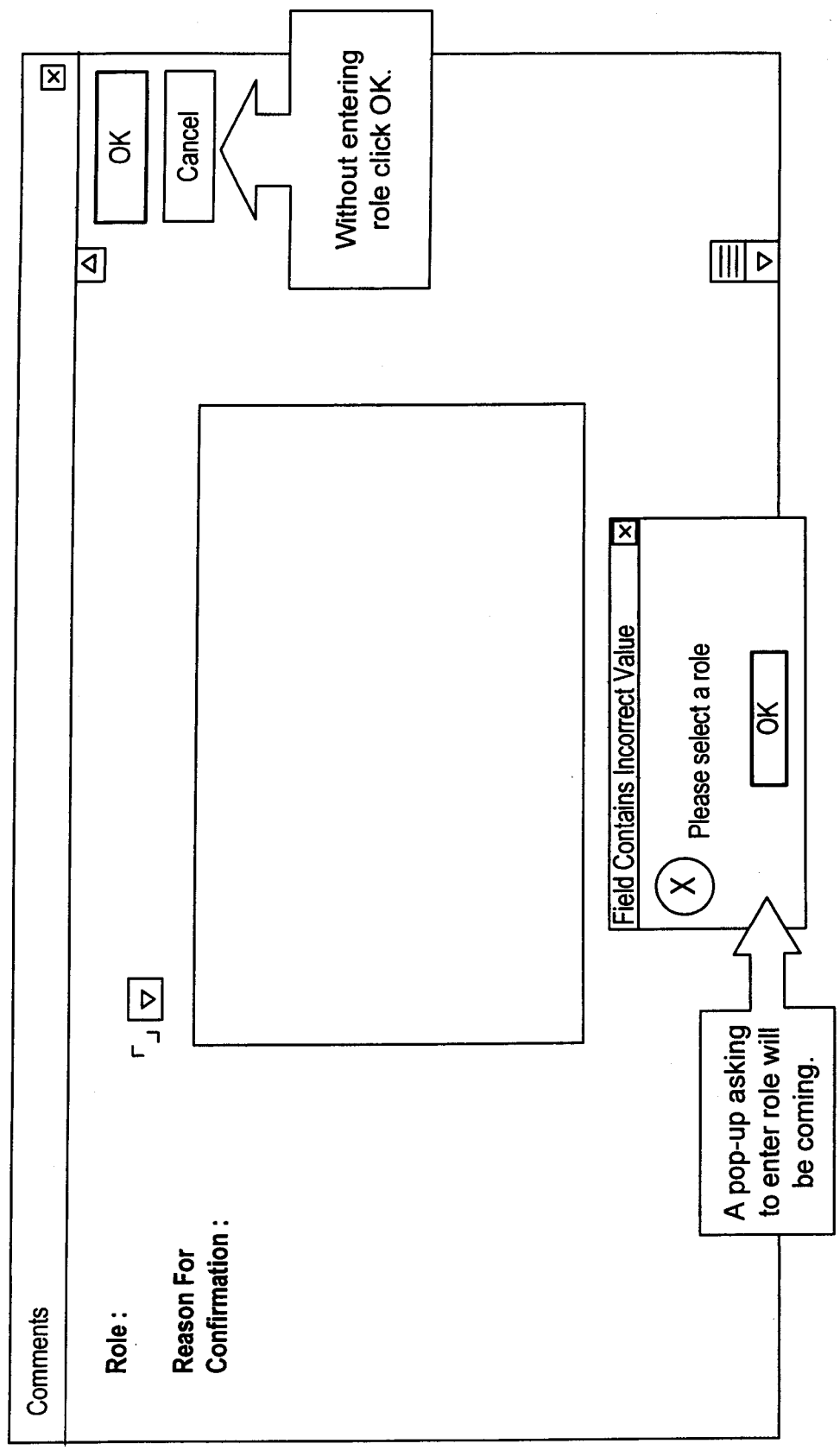
Figure 9D:
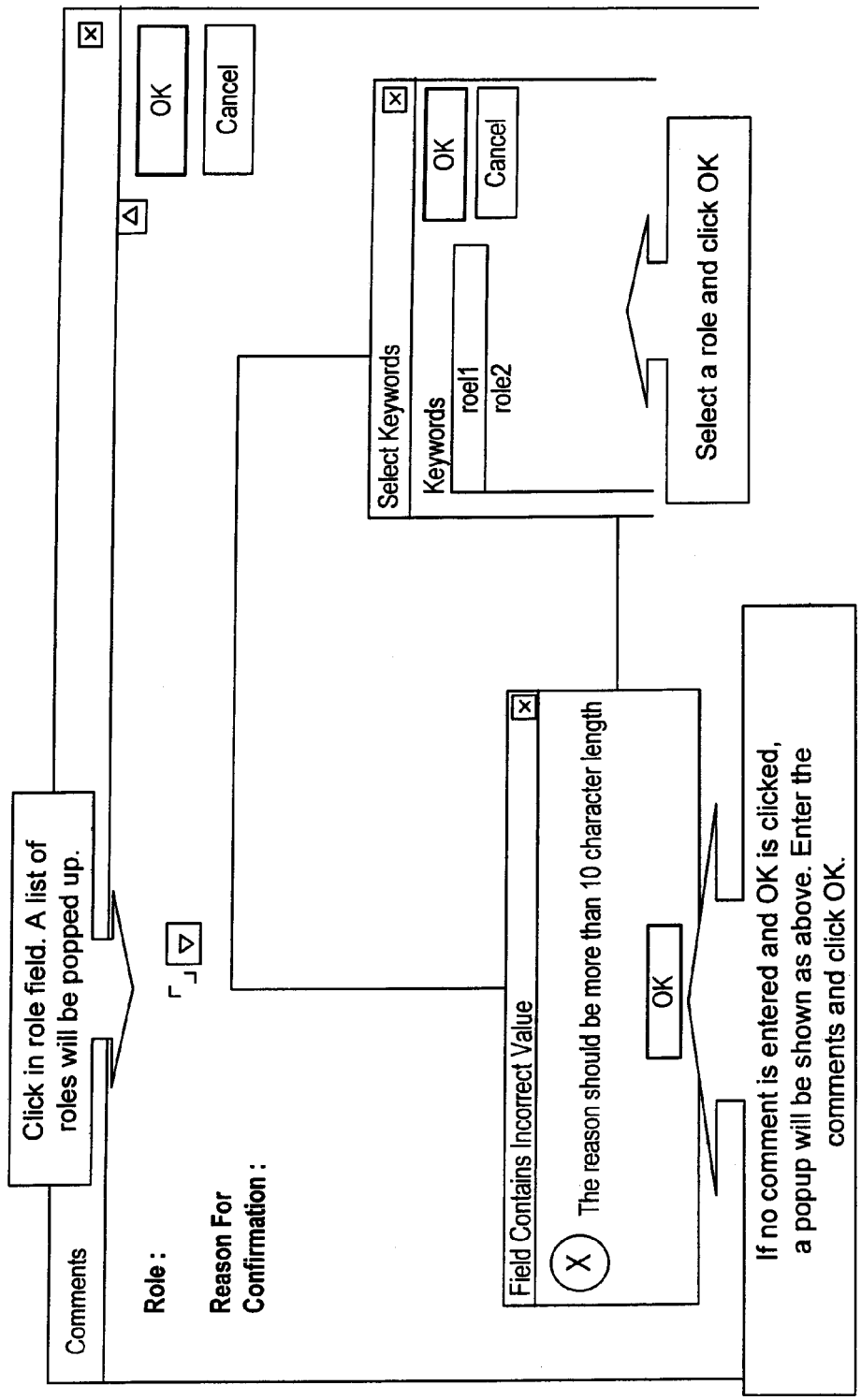
Figure 9E:
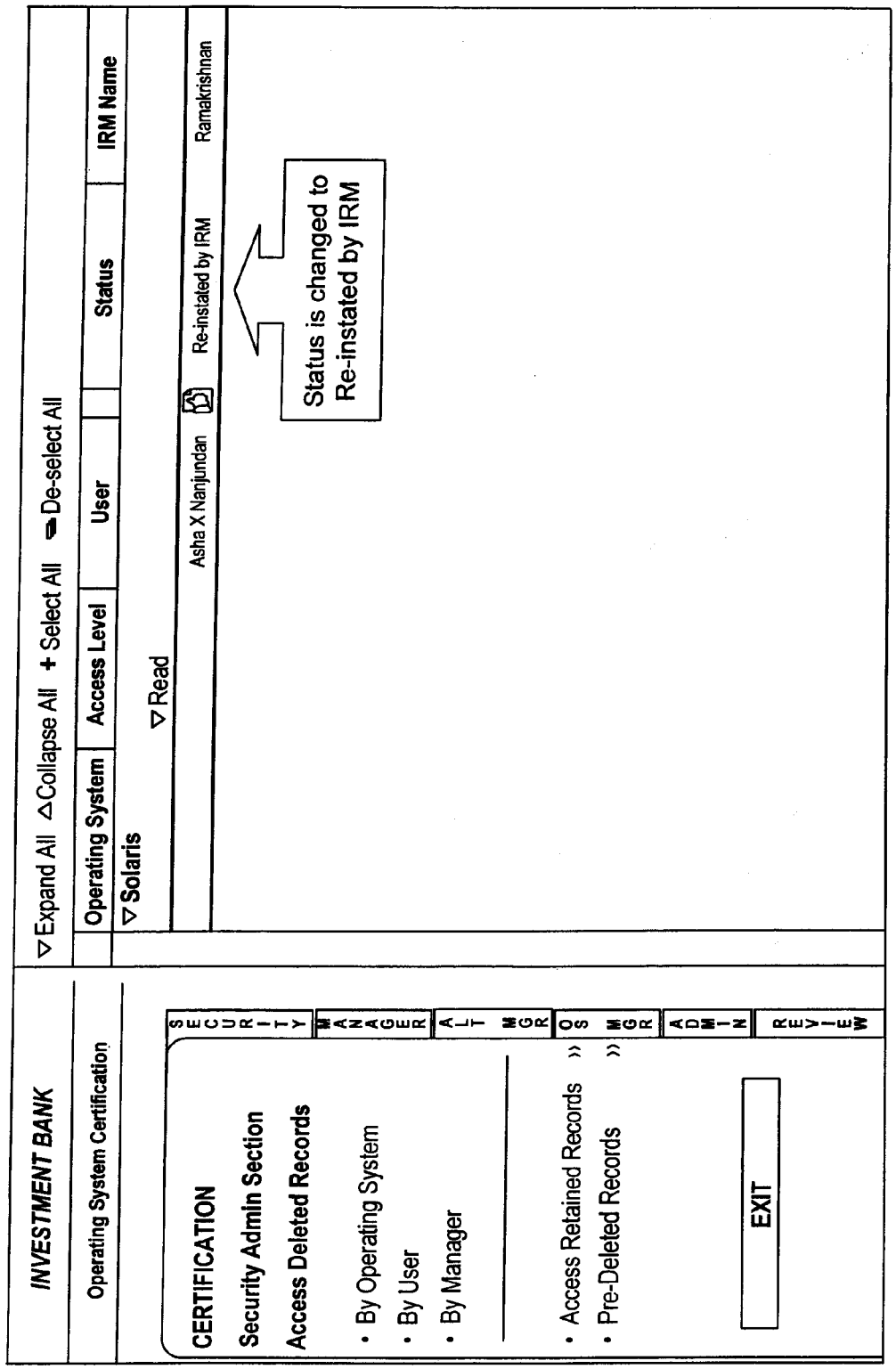

As shown in FIG. 3C, during a re-certification session, the reviewer could modify the timeframe of performing a re-certification for the user, or set a time restriction 317. According to one approach, the time restriction could be a time period during which the user is allowed to access the applications. According to another approach, the time restriction could be specific dates on which the user is allowed to access the applications. In addition, the reviewer will decide whether the functional roles of the user have changed since the initial approval or the last re-certification 318. If the user's functional roles have not changed, the reviewer will confirm that the user is allowed to continue to access the applications he is entitled to 319. If the user's functional roles have changed, the reviewer will decide whether the user's access rights to some applications needed to be added or cancelled 320. If the user is not entitled to access the applications anymore (e.g., the user leaves his job), the reviewer will choose to cancel the user's access rights to the applications 321. When the user's functional roles have changed, he probably need to access additional applications, or doesn't need to access some applications. Under this circumstance, the reviewer will add the new applications the new functional roles require, and/or remove the unwanted applications the user doesn't need in his new functional roles, and vice versa 322. The re-certification system sends a message to the application owners, and/or notifies the cancelled applications, and/or obtain permissions for the new added applications 323 (e.g., as shown in FIGS. 8A-8C). The application owners will decide to approve or reject the requested applications 324 (e.g., as shown in FIG. 8D-8E). Based on the results of the re-certification session by the reviewer and the decisions by the application owners, the re-certification system will update the user's access rights profile and establish a new authorization for the user 325. Thereafter, the re-certification system will carry out the re-certification process according to the new methodology defined in the updated user's profile and the re-certification process is completed 326.

It should be understood that the fact that a reviewer re-certifies one user each time is exemplary only, and that the re-certification process can be configured so that the reviewer can re-certify a list of users at one time whose re-certification processes are due at the same time or within a same period.

When a user's access rights are suspended or revoked, whether it is due to failure in carrying out re-certification timely by a reviewer or removal by a re-certification process, according to one approach, they can be re-instated if the reviewer sends a request to a re-certification administrator. The re-certification administrator will update the user's profile and his access rights are then instated. According to another approach, they can be re-instated by the security administrator (e.g., as shown in FIGS. 9A-9E).

Although an illustrative embodiment of the present invention, and various modifications thereof, have been described in detail herein with reference to the accompanying figures, it is to be understood that the invention is not limited to this precise embodiment and the described modifications, and that various changes and further modifications may be effected therein by one skilled in the art without departing from the scope or spirit of the invention as defined in the claims.

The invention claimed is:

1. A method of re-certifying a user's access rights to applications maintained in an institution's computer system to ensure that the applications are accessed by appropriate users, comprising the steps of:

assigning a recertification timeline for the user's access rights and a user's reviewer to perform the recertification;

notifying, by a re-certification administrator, the user's reviewer to re-certify the user's access rights to the applications maintained in the institution's computer system, wherein user has access to the applications maintained in the institution's computer system based upon a user's functional role, and wherein further the notification is completed by sending a message, electronically, to the user's reviewer at a time prior to a re-certification due date, requesting the user's reviewer to re-certify the user's access rights, by a predetermined date and the message comprises a list of users whose access rights need to be re-certified and lists a predetermined date for the re-certification of each user's access rights;

further notifying, by the re-certification administrator, the user's reviewer to re-certify the user's access rights to the applications maintained in the institution's computer system in response to the user's reviewer choosing not to respond to the notification;

deciding, by the user's reviewer, whether to change the user's reviewer in response to the notification;

initiating, by the user's reviewer, a re-certification process for the user by electronically selecting a link within the message, wherein the link comprises options comprising adding or removing the applications and changing the recertification timeline;

confirming, during the re-certification process, by the user's reviewer, the applications that the user is allowed to continue to access based upon the status of the user's functional role within the institution;

adding, during the re-certification process, by the user's reviewer, new applications in response to the user's functional role within the institution changing and the user's new functional role requiring accessing additional applications;

removing, during the re-certification process, by the user's reviewer, the applications that the user does not require access to due to the fact that the user's functional role within the institution have changed and his new functional role does not require to access these applications which he used to access in his previous functional role; and updating the user's access rights so that the user is only able to access the applications allowed by the most recent re-certification process.

2. The method of claim 1, wherein the step of further notifying the reviewer to re-certify the user's access rights if the user's reviewer chooses not to respond to the notification comprises:

sending a reminder message by the re-certification administrator with a configured frequency to the user's reviewer, for reminding him of re-certifying the user's access rights, based upon the user's reviewer lack of response to the last notification message and it is not within a configured warning period for the user's re-certification process;

sending a warning message by the re-certification administrator with a configured frequency to both the user's reviewer and the user, for notifying them that re-certification will be due on a specific date, and that the user's access rights will be suspended in case the user's reviewer will not carry out the re-certification by that date, based upon the user's reviewer lack of response to the last notification message and it is within a warning period for the user's re-certification process; and suspending, by the re-certification administrator, the user's access rights upon the user's re-certification being due and the user's reviewer not completing the re-certification.

3. The method of claim 1, wherein the step of deciding whether to change the user's reviewer if the reviewer chooses to respond to the notification comprises:

assigning, by the user's reviewer, a new reviewer; and sending, by the re-certification administrator, a message to the new reviewer for notifying the new reviewer of re-certifying the user's access rights.

4. The method of claim 1, wherein the step of deciding whether to change the user's reviewer if the reviewer chooses to respond to the notification comprises:

sending, by the user's reviewer, a notification message to a responsible entity for asking to assign a new reviewer based upon a change in the user's reviewer wherein the new reviewer is not assigned by the user's reviewer;

assigning, by the responsible entity, a new reviewer for the user; and sending, by the re-certification administrator, a message to the new reviewer for notifying the new reviewer of re-certifying the user's access rights.

5. The method of claim 1, further comprising the step of:

modifying, during the re-certification process, by the user's reviewer, a timeframe of performing a re-certification for the user.

6. The method of claim 1, further comprising the step of:

setting, during the re-certification process, by the user's reviewer, a time period or dates during which the user is allowed to access the applications.

7. The method of claim 1, further comprising the step of:

sending, by the re-certification administrator, a message to application owners for obtaining permissions for the new added applications and notifying the removed applications due to the changes of the user's functional role within the institution;

authorizing, by the application owners, accesses to the new added applications based upon a review of the new added applications; and removing, by the application owners, accesses to the applications the user's reviewer notifies the application owners to remove.

8. The method of claim 1, wherein the applications maintained in an institution's computer system comprise operating systems, software, intellectual properties, production processes, or databases.

9. The method of claim 1, wherein the user's reviewer comprises the user's supervisor, manager, or a representative who is designated by the user's supervisor, manager, or the re-certification administrator.

10. The method of claim 4, wherein said responsible entity comprises a human resource department or the re-certification administrator.

11. The method of claim 2, wherein said warning period is a configured time period prior to the re-certification due date.

12. The method of claim 7, wherein said application owner is a responsible person who assumes responsibility of authorization or rejection of access to an application.

13. An application access re-certification system, said system being used to re-certify a user's access rights to applications maintained in an institution's computer system to ensure that the applications are accessed by appropriate users, comprising:

a central facility for operating an institution's computer system;

a human resource facility for defining functional roles of the users of an institution's computer system;

a security administration facility for managing the security of the institution's computer system;

application owner terminals for authorizing or rejecting accesses to the applications by designated entities;

reviewer terminals for re-certifying user's access rights to the applications maintained in the institution's computer system;

user terminals; and a re-certification administration facility for operating a re-certification process, and communicating with the human resource facility, the security administration facility, the application owner terminals, the reviewer terminals, and the user terminals through the institution's computer system, the recertification process comprising assigning a recertification timeline for the user's access rights and a user's reviewer to perform the recertification, wherein the user's reviewer is notified, by a re-certification administrator, to re-certify the user's access rights to applications maintained in the institution's computer system, wherein user has access to the applications maintained in the institution's computer system based upon a user's functional role, and wherein further the notification is completed by sending a message, electronically, to the user's reviewer at a time prior to a re-certification due date, requesting the user's reviewer to re-certify the user's access rights, by a predetermined date, and the user's review initiates a re-certification process for the user by electronically selecting a link within the message, wherein the link comprises options comprising adding or removing the applications and changing the recertification timeline.

14. The system of claim 13, wherein the human resource facility, the security administration facility, and the re-certification administration facility comprise one or more terminals which are used specifically for re-certification purposes.

15. The system of claim 13, wherein the human resource facility, the security administration facility, and the re-certification administration facility comprise terminals which perform functions as a human resource department terminal, a security administration terminal, and a re-certification administration terminal, respectively, during the re-certification process as well as functioning as general user terminals.

16. The system of claim 13, wherein the application owner terminals and the reviewer terminals comprise general terminals which perform functions as application owners and reviewers respectively as well as user terminals.

17. A method of re-certifying a user's access rights to applications maintained in an institution's computer system to ensure that the applications are accessed by appropriate users, comprising the steps of:

assigning a recertification timeline for the user's access rights and a user's reviewer to perform the recertification;

sending, by a re-certification administrator, a message to a user's reviewer at a configured time prior to a re-certification due date, which asks the user's reviewer to re-certify the user's access rights to the applications maintained in the institution's computer system by some date;

further notifying, by the re-certification administrator, the user's reviewer to re-certify the user's access rights to the applications maintained in the institution's computer system based upon the user's reviewer choosing not to respond to the notification;

assigning, by the user's reviewer, a new reviewer in response to the user's reviewer responding to the notification, and sending, by the re-certification administrator, a message to the new reviewer for notifying the new reviewer of re-certifying the user's access rights;

initiating, by the user's reviewer, a re-certification process for the user by clicking a link within a notification message, wherein the link comprises options comprising adding or removing the applications and changing the recertification timeline;

modifying, during the re-certification process, by the user's reviewer, a timeframe of performing a re-certification for the user;

setting, during the re-certification process, by the user's reviewer, a time period or dates during which the user is allowed to access the applications;

confirming, during the re-certification process, by the user's reviewer, the applications that the user is allowed to continue to access based upon a user's functional role within the institution;

adding, during the re-certification process, by the user's reviewer, new applications based upon the user's functional role within the institution changing and the user's new functional role requiring access to additional applications;

removing, during the re-certification process, by the user's reviewer, the applications because the user's functional role within the institution have changed and his new functional role does not require to access these applications which he used to access in his previous functional role;

sending, by the re-certification administrator, a message to the application owners for obtaining permissions for the additional applications and notifying the application owners of the removed applications due to the changes of the user's functional role within the institution;

authorizing, by the application owners, accesses to the additional added applications based upon approval by the application owner of the additional added applications;

denying, by the applications owners, access to the added applications based upon a rejection by the application owner the additional added applications; and removing, by the applications owners, access to the applications the user's reviewer notifies the application owners to remove; and updating the user's access rights so that the user is only able to access the applications allowed by the most recent re-certification process.

18. The method of claim 17, wherein the step of further notifying the user's reviewer to re-certify the user's access rights if the user's reviewer chooses not to respond to the notification comprises:

sending a reminder message by the re-certification administrator with a configured frequency to the user's reviewer, for reminding him of re-certifying the user's access rights, based upon the user's reviewer not responding to the last notification message and it is not within a configured warning period for the user's re-certification process;

sending a warning message by the re-certification administrator with a configured frequency to both the user's reviewer and the user, for notifying them that re-certification will be due on a specific date, and that the user's access rights will be suspended in case the user's reviewer will not carry out the re-certification by that date, based upon the user's reviewer not responding to the last notification message and it is within a warning period for the user's re-certification process; and suspending, by the re-certification administrator, the user's access rights upon the user's re-certification being due and the user's reviewer not completing the re-certification.

19. A method of re-certifying a user's access rights to applications maintained in an institution's computer system to ensure that the applications are accessed by appropriate users, comprising the steps of:

assigning a recertification timeline for the user's access rights and a user's reviewer to perform the recertification;

notifying, by a re-certification administrator, the user's reviewer to re-certify the user's access rights to the applications maintained in the institution's computer system, wherein user has access to the applications maintained in the institution's computer system, and wherein further the notification is completed by sending a message, electronically, to the user's reviewer at a time prior to a re-certification due date, requesting the user's reviewer to re-certify the user's access rights, by a predetermined date;

further notifying, by the re-certification administrator, the user's reviewer to re-certify the user's access rights to the applications maintained in the institution's computer system in response to the user's reviewer choosing not to respond to the notification;

deciding, by the user's reviewer, whether to change the user's reviewer in response to the notification;

initiating, by the user's reviewer, a re-certification process for the user by electronically selecting a link within the message, wherein the link comprises options comprising adding or removing the applications and changing the recertification timeline;

confirming, during the re-certification process, by the user's reviewer, the applications that the user is allowed to continue to access based upon a status within the institution;

adding, during the re-certification process, by the user's reviewer, new applications in response to the user requiring access to additional applications;

removing, during the re-certification process, by the user's reviewer, the applications that the user does not require access to due to the fact that the status of the user within the institution has changed and the user does not require to access these applications which he used to access to previously; and updating the user's access rights so that the user is only able to access the applications allowed by the most recent re-certification process.

* * * * *